US007324888B1

(12) United States Patent
Stotsky

(10) Patent No.: US 7,324,888 B1
(45) Date of Patent: Jan. 29, 2008

(54) COMPUTATIONALLY EFFICIENT DATA-DRIVEN ALGORITHMS FOR ENGINE FRICTION TORQUE ESTIMATION

(75) Inventor: Alexander A. Stotsky, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/537,811

(22) Filed: Oct. 2, 2006

(51) Int. Cl.
*G06F 19/00* (2006.01)

(52) U.S. Cl. .................................................... 701/101

(58) Field of Classification Search ................ 701/101, 701/102, 110, 114
See application file for complete search history.

(56) References Cited

U.S. PATENT DOCUMENTS

| | | | | |
|---|---|---|---|---|
| 5,582,069 | A * | 12/1996 | Genise | 74/335 |
| 5,734,100 | A | 3/1998 | Kishimoto et al. | |
| 5,771,482 | A | 6/1998 | Rizzoni | |
| 5,875,759 | A | 3/1999 | Meyer et al. | |
| 5,906,652 | A | 5/1999 | Remboski et al. | |
| 6,029,109 | A | 2/2000 | Rossignol et al. | |
| 6,176,218 | B1 * | 1/2001 | Beechie et al. | 123/339.19 |
| 6,188,951 | B1 | 2/2001 | Beechie et al. | |
| 6,553,958 | B1 | 4/2003 | Kolmanovsky | |
| 6,850,831 | B2 | 2/2005 | Buckland et al. | |
| 6,866,024 | B2 | 3/2005 | Rizzoni et al. | |
| 6,895,317 | B2 * | 5/2005 | Yasui et al. | 701/36 |
| 7,031,820 | B2 * | 4/2006 | Ueda et al. | 701/101 |
| 7,054,738 | B1 | 5/2006 | Stotsky | |
| 2003/0010725 | A1 | 1/2003 | Druga | |
| 2003/0100401 | A1 | 5/2003 | Kim | |
| 2003/0183203 | A1 | 10/2003 | Unland et al. | |
| 2004/0068359 | A1 | 4/2004 | Neiss et al. | |

FOREIGN PATENT DOCUMENTS

| | | | |
|---|---|---|---|
| EP | 1 559 898 A1 | | 8/2005 |
| JP | 2002-30962 A | * | 1/2002 |

OTHER PUBLICATIONS

SAE Technical Paper Series, 841107, Torque Sensing for Controlled Alternative-Fuel Combustion in Diesel Engines I.W. Kay, and R.P.C. Lehrach, United Technologies Research Center, United Technologies Corp., East Hartford, CT, West Coast International Meeting and Exposition San Diego, California Aug. 6-9, 1984.

(Continued)

*Primary Examiner*—Hieu T. Vo
(74) *Attorney, Agent, or Firm*—Brooks Kushman P.C.

(57) ABSTRACT

New algorithms for real-time estimation of the engine friction torque are developed. Engine friction torque can be estimated in a fuel cut-off state and at engine idle. New recursive and computationally efficient data-driven algorithms are developed for adaptation of the look-up tables. The algorithms make it possible to avoid driveability problems that could result from errors in estimating engine friction torque.

16 Claims, 8 Drawing Sheets

OTHER PUBLICATIONS

SAE Technical Paper Series, New Methodology for Power Train Development in the Automotive Engineering—Integration of Simulation, Design and Testing, 2001-01-3303, Albert Albers, Marc Albrecht, Arne Kruger, and Ralph Lux, Institute of Machine Design and Automotive Engineering of the University of Karlsruhe, Reprinted From: ATTCE 2001 Proceedings vol. 2: Powertrain and Heat Transfer/Exchange (p. 368), Automotive & Transportation Technology Congress & Exhibition, Oct. 1-3, 2001, Barcelona, Spain.

SAE Technical Paper Series, 970532, Engine Torque Determination by Crankangle Measurements State of the Art, Future Prospects, Stephane Ginoux and Jean-Claude Champoussin, Ecole Centrale de Lyon, Reprinted from: Electronic Engine Controls 1997 (SP-1236), SAE Library, International Congress & Exposition, Detroit, Michigan Feb. 24-27, 1997.

Computationally Efficient Filtering Algorithms for Engine Torque Estimation, A. Stotsky, Volvo Car Corporation, Proceedings of Inst. of Mechanical Engineering, vol. 219, Part D: J. Automotive Engineering, pp. 1099-1107; Mar. 30, 2005.

* cited by examiner

COMPUTATIONALLY EFFICIENT DATA-DRIVEN ALGORITHMS FOR ENGINE FRICTION TORQUE ESTIMATION

BACKGROUND OF THE INVENTION

1. Field of the Invention

The invention relates to a technique for estimating in real-time friction torque in a vehicle engine whereby driveability problems due to inaccurate friction torque estimates are avoided.

2. Background Art

The performance of an engine control system depends on accuracy of an engine torque model. One of the important parts of the engine torque model is engine losses, which include pumping and friction losses.

Friction torque can be pre-calibrated and presented as a look-up table with two input variables (engine speed and indicated engine torque). Variability and changes of the engine components over time, as well as changes in the external environment, have a direct impact on engine friction torque, and hence on driveability performance. There exists a need, therefore, for development of real-time adaptation algorithms to improve accuracy of a friction torque component of the engine torque model.

One opportunity for estimating friction losses is during engine idle when the engine is decoupled from the driveline. The idle state, however, can provide an estimate of the friction losses only at idle speed and low indicated torque. All the nodes of the friction look-up table could be adapted by using new values of the friction torque at idle. However, even small errors in friction estimation at idle due to errors in accessory loads, for example, could lead to significant errors in the friction estimation at high rotational speeds. Moreover, the friction losses due to aging of engine components could also change as a function of the engine speed. Therefore, more points for different engine speeds and loads are required for successful adaption of a friction look-up table.

A more promising opportunity for obtaining relatively accurate estimates of friction torque is the period following engine start. At engine start, the engine speed increases to a relatively high level (compared with the idle speed), and then slowly decreases, converging to the desired idle speed. This period when the engine speed decreases provides an opportunity to estimate engine friction torque. This is discussed in A. Stotsky U.S. Pat. No. 7,054,738. A friction estimation technique that estimates friction during start and idle gives better results than a technique that estimates friction at idle only. However, better accuracy of the engine torque estimation can be achieved if more measurements of friction torque are available at high rotational speeds.

Friction losses consist of valve gear friction, piston ring friction, piston and connecting rod friction, and crankshaft friction. The friction losses increase with speed. Approximately two-thirds of engine friction occurs in the piston and piston ring assembly. Friction force on the piston assembly has a direct impact on piston acceleration, and hence on crankshaft speed variations. Wear and frictional changes with time of the engine components also affect friction losses and, in turn, crankshaft speed variations.

The amplitude of the crankshaft speed variations, which are induced by the periodic individual cylinder compression/expansion events, depends on compression pressure, friction force and viscosity of lubricating oil. It provides a mean for estimation of the engine friction and pump torques when the engine is not fueled. The same amplitude provides a mean for estimation of the engine brake torque when the engine is fueled.

In a fuel control for spark ignition automotive engines, fuel cut-off operation temporarily stops fuel injection. For example, fuel cut-off is activated when the throttle valve is completely closed and the engine speed is higher than a predetermined value (usually this threshold value of the engine speed is around 3000 rpm).

When it is determined that the driving state is in a decelerating operation state, no fuel supply is required, and thus a fuel cut-off is performed in order to enhance fuel consumption efficiency, purify exhaust gas and prevent heating of the exhaust gas purifying catalyst. During fuel cut-off operation, engine cylinders do not produce any torque, and the amplitude of crankshaft speed variations, which is usually a superposition of the variations induced by the combustion forces, friction and pump forces on the piston assembly, has a component that corresponds to the friction and pump forces, providing a mean for estimation of engine losses.

Since the fuel cut-off operation is usually performed at high rotational speeds (higher than 3000 rpm), this gives an opportunity to provide new measured data of the friction torque at high rotational speeds. Then the engine friction look-up table can be adapted if new data of the engine friction torque at high rotational speeds are available. However, crankshaft torsional vibrations, inertia torque due to reciprocating masses, piston mass imbalance, and other mechanically induced vibrations affect behavior of high resolution engine speed when the engine is not fueled.

SUMMARY OF THE INVENTION

As mentioned in the preceding discussion, errors in an estimate of friction torque in spark ignition automotive engines have a direct impact on driveability performance of a vehicle and necessitate a development of real-time algorithms for adaptation of the friction torque. Friction torque in an engine control unit is presented in the method of the present invention as a look-up table with two input variables (engine speed and indicated engine torque). Algorithms proposed in the present invention estimate the engine friction torque via crankshaft speed fluctuations in the fuel cut-off state and during idle. Computationally efficient filtering algorithms based on the Kaczmarz projection method for reconstruction of the first harmonic of a periodic signal are used. The values of the friction torque at the nodes of the look-up table are updated when new measured data of the friction torque are available. New data-driven algorithms, which are based on a step-wise regression method, are developed for adaptation of look-up tables. Algorithms may be verified by using a spark-ignition, six-cylinder prototype engine.

An engine torque estimation function is based on a monitoring of individual fluctuations of the high resolution engine speed signal for individual cylinders. The engine speed signal is based on the measurements of a passage of time between two teeth on a crankwheel. The passage time decreases as the rotational speed increases. Thus, time interval errors increase. Moreover, low frequency oscillations from the powertrain and high frequency oscillations due to the crankshaft torsion, together with vibrations induced by the road, act as disturbances on the crankshaft. These disturbances influence directly the validity of the engine speed signal and consequently the torque monitoring function.

This problem described above is more important for six and eight cylinder engines than, for example, five cylinder engines. This is due to a larger amount of events that should be recognized in the presence of the described disturbances. The same disturbances act on the crankshaft when the engine is defueled. This necessitates development of computationally efficient filtering algorithms, which recover the engine speed fluctuations corresponding to the expansion events from the noise contaminated measurements.

The algorithm proposed in the present invention can be divided into two parts: the first part is engine friction estimation by using crankshaft speed variations during fuel cut-off and the second part is adaptation of the friction look-up table when new data of the friction torque are available.

The high resolution engine speed can be approximated by a trigonometric polynomial due to the periodic nature of both engine rotational dynamics and combustion forces as functions of an engine crank angle. A filtering technique uses the periodic signal at the combustion frequency, and the amplitudes of the trigonometric functions are updated recursively according to a trigonometric interpolation method in a moving window of a certain size. The update law in the trigonometric interpolation method has a relatively simple form due to orthogonality of the trigonometric polynomials in certain intervals. The orthogonality condition imposes restrictions on the window size and limits the performance of the algorithm (too large window size implies relatively large estimation errors during engine speed transients).

The approach used in the present invention is also based on the approximation of engine speed via a trigonometric polynomial with known frequencies and unknown amplitudes. However, the estimated amplitudes are updated according to the Kaczmarz projection method, where the model matches the measured signal exactly at every discrete step. The convergence of the estimated parameters to their true values is ensured due to the richness (persistency of excitation) of the measured periodic engine speed signal, which is approximated by the trigonometric polynomial. This, in turn, implies faster convergence of the estimated parameters to their true values and acceptable performance of the algorithm. The signal is completely reconstructed by the trigonometric polynomial and the filter uses a periodic signal at the engine combustion frequency. The values of the trigonometric functions are computed recursively by using Chebyshev's three term recurrence relations for the trigonometric functions, thereby making the algorithm computationally efficient and implementable. The filtering approach described above and applied to the estimation of the engine brake torque is applied in the present invention for estimation of the engine losses during fuel cut-off operation.

Adaptation of the look-up tables (static maps) is widely used in the engine control to improve robustness of the engine control system. Usually, a total engine operation region is subdivided into several parts, and new values are memorized for every operating region to form a new look-up table. Linear interpolation is used for interpolating the values of an operating parameter between the regions. However, new data are often available in specific operating regions only. For example, the engine friction look-up table should be adapted by using new data obtained during the fuel cut-off state; i.e., at zero indicated torques only. If the values of the friction torque are not renewed in other regions, then there could be a big difference between the values of the friction torque in the segment of zero indicated torques and the values of the friction torque in neighboring segments. Then, the friction torque under a transient from zero indicated torques to higher indicated torques changes significantly. This deteriorates the performance of the engine control system, which is based on the torque model. This also necessitates the development of new algorithms for adaptation of look-up tables, which allow a prediction of the values of the friction torque even for the operating regions with meager new data representation.

Another simple method for compensation for model inaccuracy and for improvement of the robustness of the engine control system is an introduction of a direct adaptation law driven by the error between the model (look-up table) and the sensor output. In a known general method of adaptation of the engine brake torque, two adaptive parameters are introduced as multiplicative and additive factors to a pre-calibrated model of the engine torque. Parameters are adapted by using a direct gradient adaptation law driven by the error between measured and estimated engine speeds. A disadvantage of direct adaptation law, however, is its slow convergence and sensitivity to disturbance factors. Moreover, since the values of the adapted parameters are not memorized in the look-up table, a certain time is required for adaptation after every transient. This deteriorates the performance of the adaptive system, which in turn has a direct impact on driveability performance of a vehicle, fuel economy and emissions. Adaptation algorithms for look-up tables proposed in the present invention overcome these difficulties.

In the approach for adaptation of the look-up table proposed in U.S. Pat. No. 7,054,738, a look-up table is presented as a manifold (surface) for engine friction torque in three-dimensional space with engine speed and indicated torque as independent variables, whereby the shape of the manifold reflects physical dependencies of the friction torque as a function of speed and indicated torque. If new data are available only in a certain operating region, then only a part of the manifold parameters are adapted (for example, the offset and the gradient in the engine speed direction).

Adaptation of the look-up table is associated with motion of the manifold in three-dimensional space. The position and the orientation of the manifold in three-dimensional space change only after adaptation, which in turn allows for a prediction of the friction torque for a wide range of speeds and indicated torques, even with only a few new measured points, by taking into account physical dependencies. These are present in the shape of the manifold. However, in the approach presented in U.S. Pat. No. 7,054,738, the parameters to be adapted (coefficients of a polynomial) are chosen beforehand and are not coupled to the parameters of new data. Accuracy of adaptation, however, depends on accuracy, consistency and a sufficient sample size of new data of the operating parameter (friction torque).

Different driving cycles and conditions give different sets of data of new measured friction torque. Therefore, the selection of the parameters that should be adapted depends on which kind of new data is available. For example, for some new data sets, only the offset to the friction torque look-up table should be updated. For other data sets, both the offset and the gradient in engine speed direction are updated.

The approach proposed in the present invention is based on step-wise least-squares method. It provides a more flexible approach in which the parameters to be adapted are chosen in every step.

A step-wise regression method examines new terms incorporated in the model at every stage of the regression. After each new term is selected, its contribution is reviewed to ensure that it remains significant. Step-wise regression is defined as a data-driven automatic variable selection scheme, which is efficient for processing of small data sets isolated from each other. As a rule, for adaptation of look-up tables in engine control applications, only data sets of a relatively small size are available. Only a few parameters, which can be chosen in advance, should be adapted. For example, for adaptation of the friction torque look-up table described in the present invention, only an offset and gradient in the engine speed direction should be adapted. As a result, the order of new candidate terms, which should be tested for inclusion in the model, can easily be established by taking into account physical dependencies.

Adaptation algorithms for real-time control applications should be computationally efficient. A step-wise regression method is suited well for adaptation of look-up tables, where it is applied to the data sets of a relatively small size, isolated from each other, and pre-screening (pre-order) of candidate terms eliminates redundancy. A step-wise regression method allows for a choice of a minimal number of terms, thereby avoiding unnecessary calculations. Moreover, a recursive algorithm is developed in the present invention to allow for calculating a parameter vector using values of the parameters in the previous step, thus making the method computationally efficient and implementable.

The problem of adaptation of the look-up tables is reduced in this invention to a calculation of an additive compensation term presented in the form of a polynomial that approximates a difference between new measured values of the operating parameter and the values of the parameter calculated from the look-up table. The coefficients of the polynomial are updated step-wise in the least-squares sense. The coefficients, which are continuously updated when new data of the operating parameter is available, reside in the memory of the engine control unit. The values of the operating parameter are continuously calculated by using a polynomial, forming an additive compensation term to a look-up table. In each step, the difference between new measured data of the operating parameter (friction torque) and pre-calibrated values of the operating parameter from a look-up table is approximated by a polynomial and a new candidate term is tested for inclusion in the model.

The decision about inclusion of a new term in the model is based on a comparison of variances of the approximation errors in the current and previous steps. In other words, inclusion of a new term should reduce the variance; and moreover, this reduction should be significant. The test for comparison of two variances is a hypothesis test, whereby a hypothesis that two variances are equal is taken as a null hypothesis. In order to reject the null hypothesis, the difference between two compared variances with certain degrees of freedom and a level of significance should be significant.

A null hypothesis can be tested provided that the approximation errors are normally distributed in each step of the regression. F-distribution is used for hypothesis testing of equal variances. The process is stopped if a corresponding variance and a variance of measurement noise are approximately the same or all the terms are used up. A step-wise model construction allows for a choice of a minimal number of terms in the approximating polynomial for a given new data set of the operating parameter. The terms that do not reduce significantly an approximation error are not included in the model. If the operating parameter, which is presented in the look-up table, is a function of one variable only, then the procedure of inclusion of new term in the model, described above, is just a selection of the order of the polynomial. Polynomials of low order, which are robust with respect to measurement noise, might give a relatively large approximation error. Polynomials of a high order do not smooth measurement noise, which in turn affect coefficients of the polynomial, thereby deteriorating accuracy of approximation.

An optimal order of the polynomial depends on the accuracy and consistency of new data of a certain size. As a rule, an order of the polynomial, which describes an additive compensation term to pre-calibrated look-up table, is low. For example, very often only the offset and gradient in one of the directions are adapted. This in turn allows for a use of a-priori information, and it takes into account physical dependencies that are present in the pre-calibrated look-up table.

The look-up table, which should be adapted, is presented in the form of a surface, which defines the operating parameter as a function of two independent variables so that the shape of the surface reflects physical dependencies of the engine operating parameter as a function of independent variables (usually engine speed and load are chosen as the independent variables). The values of the compensation term, which is constructed by the step-wise regression method, are evaluated and added to each node of the look-up table. Therefore, adaptation of the look-up table is associated with motion of the surface in three-dimensional space. The position and the orientation of the surface in three-dimensional space change only after adaption, since the order of the polynomial, which describes the compensation term, is low. Often only the offset and the gradient in one of the directions are adapted.

The adaptation mechanism can be seen as a sequence of steps. In each step the position of the surface, which represents the operating parameter in three-dimensional space, changes starting with a certain position corresponding to a pre-calibrated value of the operating parameter and approaching the surface corresponding to actual value of the operating parameter. This allows for a prediction of the values of the operating parameter, even with few new measured points by taking into account physical dependencies that are present in the shape of the surface.

If new data are available only in a certain operating region, then a part of the manifold parameters are adapted (for example, the offset and the gradient in the engine speed direction). Since indicated engine torque is zero during fuel cut-off operation, the approach of the present invention allows for adaptation of the offset and gradient in the engine speed direction only. Moreover, since the fuel cut-off is performed at high rotational speeds only, the approach of the present invention should be combined with a friction estimation at idle, which is based on a different physical principal and provides a friction estimate at low rotational speed and indicated torque.

DETAILED DESCRIPTION OF AN EMBODIMENT OF THE INVENTION

Estimation of Engine Losses During Fuel Cut-Off State

Figure 1:
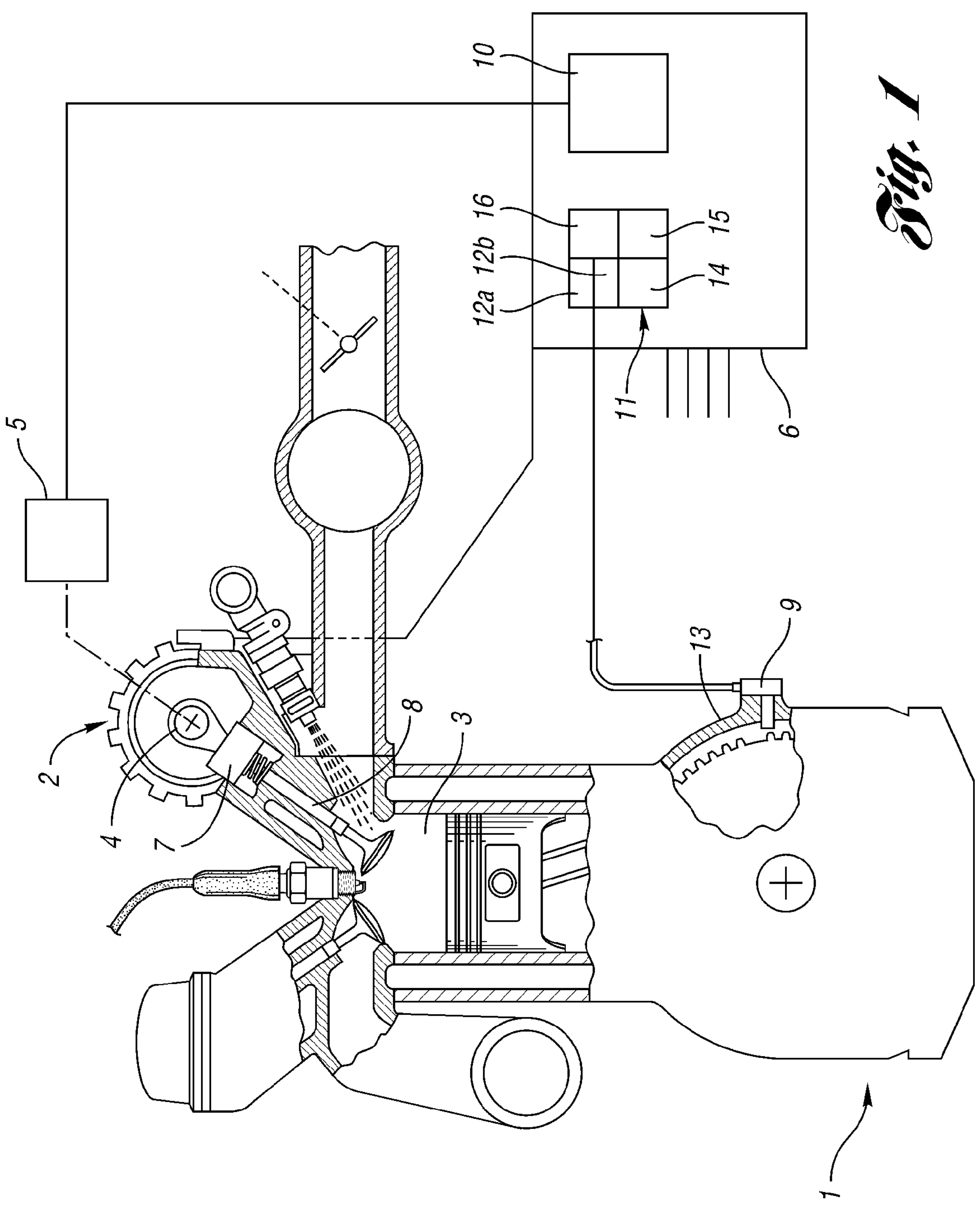
FIG. 1 is a schematic view, partly in cross-section, of an internal combustion engine with which the method of the invention may be practiced.

FIG. 1 shows in schematic form an internal combustion engine 1, which is provided with an evaluating device 11 for determining a variation of engine speed. The engine shown may be equipped with a variable valve control 2, although the invention can also be used on engines that do not have a variable valve control 2.

Evaluating device 11 receives from crankshaft sensor 9 a signal corresponding to the angular position of crankshaft 8. In one embodiment, this signal consists of a pulse train, with each pulse corresponding to a specific section of an angle swept by crankshaft 8. At a designated position 13 of the crankshaft, a specific pulse is generated that makes it possible to determine the absolute position of the crankshaft.

The evaluating device 11 includes means 12 for assigning a trigonometric polynomial representing the engine speed. The trigonometric polynomial is expressed as a set of trigonometric functions, each trigonometric function including a model coefficients. The means 12 for assigning a trigonometric polynomial therefore includes two memory areas, an array 12*a* representing a set of trigonometric base functions and a matrix 12*b* representing model coefficients to be determined.

The evaluating device further includes means 16 for retrieving a set of measurement data. The retrieving means 16 receives data from the engine crankshaft sensor. The data received corresponds to the crankshaft position at a given time. The engine speed can be locally determined from the crankshaft position by computing a first differential.

Furthermore, evaluating device 11 interpolates at 14 trigonometric polynomials for measurement data by determining model coefficients. The measurement data are stored in a third memory array 15. The model coefficients may be determined by use of recursive formulas when a starting value necessary for use of recursive calculations exists. The model coefficients are stored in a matrix 12*b* for later access for recursive calculation of model coefficients in later steps.

The variable valve control 2 is arranged to control gas exchange into or out from a plurality of cylinders 3 of the combustion engine 1 by selection of camshaft profile of a camshaft 4. The camshaft 4 has a first cam having a first cam profile and a second cam having a second cam profile greater than said first cam profile. The variable valve control 2 includes an actuating device 5, which is controlled by electronic control unit 6. The actuating device 5 maneuvers the camshaft in order to set one of the cam profiles acting on lift mechanisms 7 for gas exchange valves 8. The variable valve control, which in the embodiment shown, is arranged on the intake valve, but it can also be arranged on the exhaust valve.

The variable valve control 2, which is arranged to control the position of a camshaft 4, is variable with respect to the angular position of a crankshaft by means of an adjusting device 5.

The adjusting device 5 for changing camshaft mode is controlled by a valve control unit 10 arranged in the electronic control unit 6. The control is performed in a manner known to a person skilled in the art in order to provide switching of camshaft mode in dependence of engine operating condition.

Figure 2:
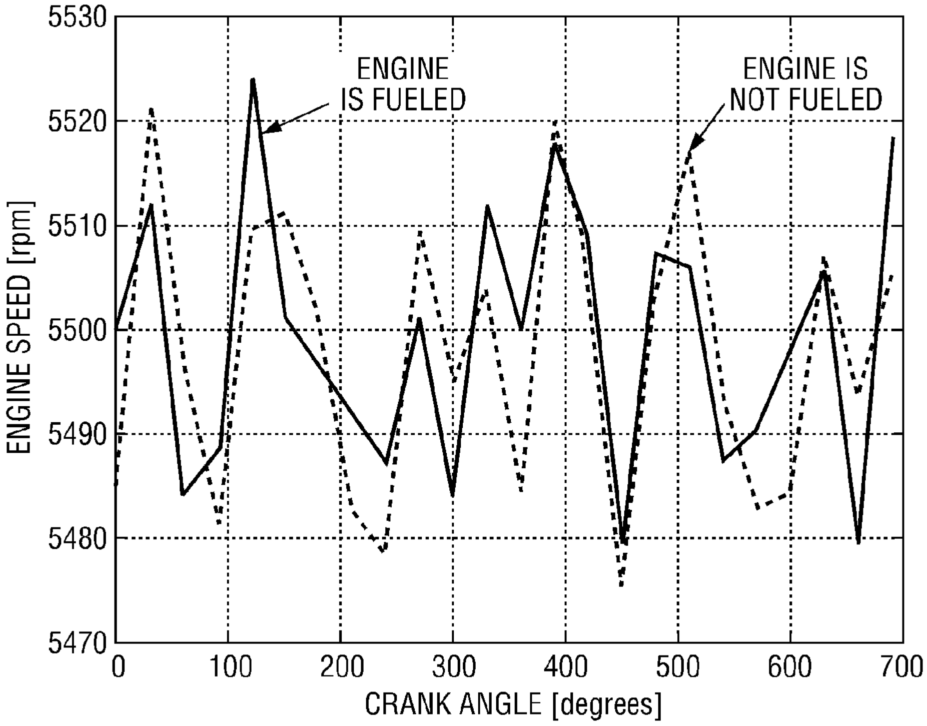
FIG. 2 is a plot of engine speed versus crank angle during single engine cycle for a six cylinder engine of the type shown in FIG. 1.
Figure 2A:
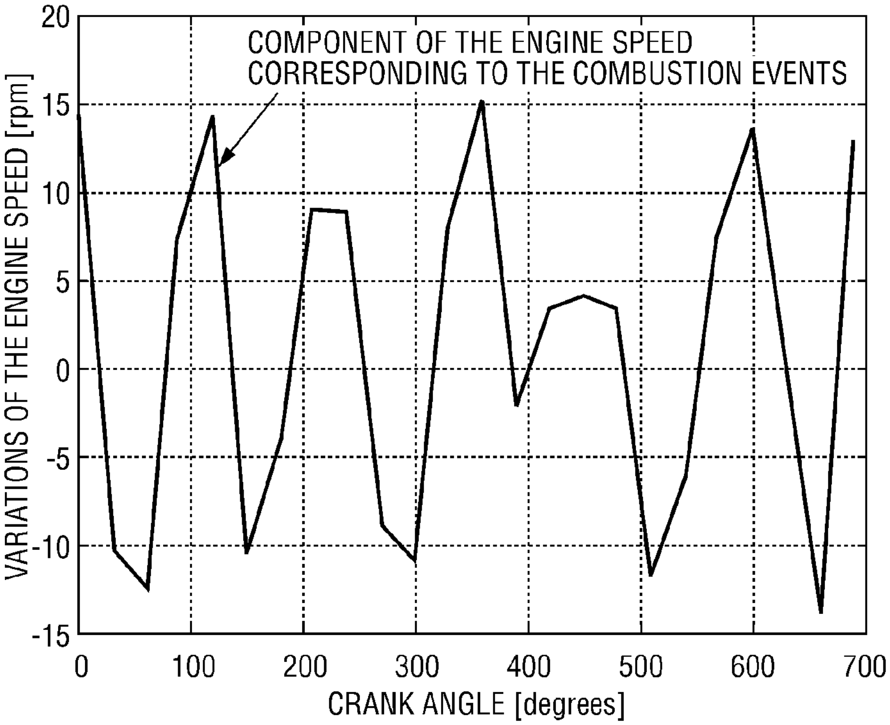
FIG. 2*a* is a plot of variations in engine speed versus crank angle during a single cycle of a six cylinder engine of the type shown in FIG. 1.

High resolution engine speed signals, when the engine is fueled and not fueled, are plotted in FIG. 2. FIG. 2*a* shows the difference between two signals plotted in FIG. 2; i.e., FIG. 2*a* shows the engine speed variations corresponding to the combustion events. By learning the engine behavior when the engine is not fueled and then subtracting the learned behavior when engine is fueled, it is possible to estimate the engine speed variations corresponding to the combustion events and to compensate for disturbances acting on a crankshaft.

As a rule, a passage time between two teeth on a crankwheel is measured in production engines. The high resolution engine speed signal is then calculated as a ratio of the length of the angular segment on the crankwheel and the passage time for this segment.

A single engine cycle is plotted in FIG. 2. Relative load is 100%. An engine speed signal, when the engine is fueled, is plotted with a solid line. An engine speed signal, when the engine is not fueled, is plotted with a dotted line.

A single engine cycle is plotted also in FIG. 2*a*. Again, the relative load is 100%. Engine speed variations corresponding to the combustion events are plotted in FIG. 2*a* with a solid line.

The combustion state of the given cylinder is defined via the amplitude. The amplitude for the cylinder, whose power stroke occurs in the interval, in turn is defined as the difference between maximum and minimum values of the high resolution engine speed signal. The corresponding amplitude, which is the measure of the crankshaft speed perturbations induced by the periodic impulsive cylinder individual torque contributions, provides a mean for estimation of the engine torque. The same amplitude, when the engine is defueled, provide a mean for estimation of the engine losses.

Figure 3:
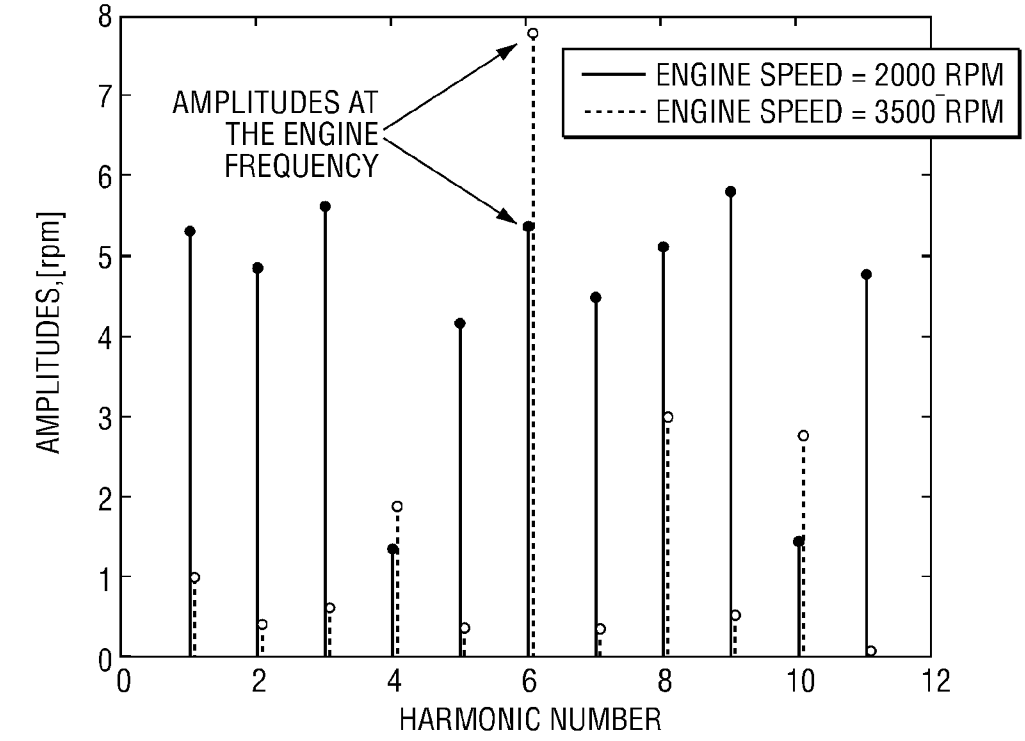
FIG. 3 shows the harmonics of an engine speed signal at 2000 rpm and 3500 rpm when the engine is not fueled.

FIG. 3 shows the harmonics of the engine speed signal, when the engine is not fueled, at 2000 rpm and 3500 rpm calculated by the Discrete Fourier Transform (DFT) method. The engine speed was measured with a step of 30° CA (Crank Angle). The data was acquired over a 720° CA window. Amplitudes are plotted as a function of a harmonic number of a periodic signal with a period of 720° CA. The harmonic number is defined as an integer which is equal to the ratio of two periods, $$n_h = \frac{720^\circ}{T_h},$$

where $T_h$ is the period of the harmonic.

FIG. 3 shows that the engine speed signal at low rotational speeds has a dominating component, which corresponds to engine frequency. The engine speed signal at high rotational speeds has fluctuations that occur as a consequence of the engine events (expansion events driven by the compression pressure) and low frequency oscillations from the power-train, as well as high frequency oscillations due to crankshaft torsion. The high frequency oscillations due to the crank-shaft torsion and low frequency oscillations from the pow-ertrain could be greater than the oscillations induced by the engine events.

Harmonic contents of the engine speed signal at 2000 rpm and at 3500 rpm, which are calculated via the DFT method, show that the development of computationally efficient algorithms that recover engine speed fluctuations corre-sponding to the engine events from the noise contaminated measurements of the engine speed when the engine is not fueled is required. The input sequence is sampled with the step of 30°. The data is acquired over a 720° window. The engine is not fueled. Amplitudes are plotted as a function of the harmonic number of the signal with a period of 720° CA. The engine operates at full load. Amplitudes at 2000 rpm are plotted with a dotted line, and amplitudes at 3500 rpm are plotted with a solid line.

Suppose that there is a set of the Crank Angle (CA) synchronized engine speed data $\omega_k$, k=1, 2 . . . , measured at the following points $x_k = k\Delta$ where $\Delta$ is a step size; namely, $$\Delta = \frac{L_c}{n_p N}, \tag{1}$$

where N is the number of the cylinders of the engine, $n_p$ is the number of points measured for each combustion event ($n_p \geqq 3$), $L_c$ is the length of the engine cycle in CA degrees (as a rule, $L_c = 720^\circ$). Since an engine crankshaft is usually provided with 58 teeth and a gap corresponding to two missing teeth, the step $\Delta$ should be a multiple of 6°. According to the Shannon theorem, two points per each firing event are required to recognize the signal of the combustion frequency. However, the phase of the signal changes due to cycle-to-cycle variations, oscillations due to the crankshaft torsion and other factors. In addition, in order to recognize the high frequency disturbances acting on the crankshaft, it is necessary to measure more points per each combustion event. Usually, four points per each combustion event are measured for six cylinder engines.

The measured signal $\omega_k$ can be approximated by the following trigonometric polynomial:

$$\hat{\omega}_k = a_{0k} + \sum_{q=1}^{n} (a_{qk}\cos(qx_k) + b_{qk}\sin(qx_k)), \tag{2}$$

where $a_{ok}$, $a_{qk}$ and $b_{qk}$ are adjustable parameters, q=1, 2, . . . , n is the frequency and $X_k = k\Delta$ (k=1, 2, . . . ). Equation (2) plays the role of a model, which has to match the measured data $\omega_k$. Assume that the measured variable $\omega_k$ can be presented as follows:

$$\omega_k = a_{0*} + \sum_{q=1}^{n} (a_{q*}\cos(qx_k) + b_{q*}\sin(qx_k)), \tag{3}$$

where $a_{0*}$, $a_{q*}$, $b_{q*}$ are constant unknown parameters. In other words, it is assumed that the measured signal $\omega_k$ can be approximated by the trigonometric polynomial with known frequencies and unknown amplitudes.

The equations (2) and (3) can be written in the following form:

$$\hat{\omega} = \psi_k^T \vartheta_k, \tag{4}$$

$$\omega = \psi_k^T \vartheta_*, \tag{5}$$

where $\vartheta_k$ is the vector of the adjustable parameters $$\vartheta_k^T = [a_{0k} a_{1k} b_{1k} a_{2k} b_{2k}, \ldots, a_{nk} b_{nk}], \tag{6}$$

$\vartheta_*$ is the vector of true parameters, $$\vartheta_*^T = [a_{0*} a_{1*} b_{1*} a_{2*} b_{2*}, \ldots, a_{n*} b_{n*}], \tag{7}$$

and $$\psi_k^T = [1\ \cos(x_k)\sin(x_k)\cos(2x_k)\sin(2x_k), \ldots, \cos(nx_k)\ \sin(nx_k)] \tag{8}$$

is the regressor. Notice, that the regressor $\psi$ includes n distinct frequencies and hence it is sufficiently rich for identification of 2n parameters of the signal (3).

Then, the estimation problem can be stated as follows: to find the update law $\vartheta_k$, such that the following equality holds at every step, $$\omega_k = \hat{\omega}_k \tag{9}$$

and the vector of the adjustable parameters $\vartheta_k$ converges to the vector of true parameters $\vartheta_*$. Then, the engine speed signal $\omega_k$ can fully be reconstructed by the polynomial (2). The components of the polynomial (2), which describe engine events, can be used for the engine losses estimation.

Consider the following adjustment law:

$$\vartheta_k = \vartheta_{k-1} + \frac{\psi_k}{\psi_k^T \psi_k}(\omega_k - \vartheta_{k-1}^T \psi_k) \tag{10}$$

By substituting (10) into the right hand side of (4), it is easy to see that (9) is true. Notice that $\psi_k^T \psi_k = n+1$, where n is the number of frequencies involved and the adjustment law has a very simple form, namely:

$$\vartheta_k = \vartheta_{k-1} + \frac{\psi_k}{(n+1)}(\omega_k - \vartheta_{k-1}^T \psi_k) \quad (11)$$

Algorithm (11) guarantees the exact approximation of the measured data at every step, and the convergence of the parameters $a_q$, $b_q$, q=1, . . . , n to their true values due to the sufficiently rich regressor ψ, which contains n distinct frequencies. Properties of algorithm (11) are described in Appendix A.

Since the measured signal is completely reconstructed by the polynomial (2), the following filtered signal is used for estimation of engine events:

$$\hat{\omega} = a_{ok} + a_{ck}\cos(q_c x_k) + b_{ck}\sin(q_c x_k), \quad (12)$$

where $q_c$ is the engine frequency, and $a_{ok}$, $a_{ck}$, $b_{ck}$ are updated according to (11).

The trigonometric functions in the regressor (8) at step k are computed recursively by using the values of the regressor at step k−1. It is necessary to compute sin(qkΔ) and cos(qkΔ), which are the elements of the regressor ψ at step k via the elements sin(q(k−1)Δ) and cos(q(k−1)Δ) of the regressor at the step (k−1). First sin(kΔ) and cos(kΔ) (q=1) are computed via sin((k−1)Δ) and cos((k−1)Δ) and cos(Δ), sin(Δ). The remaining terms are computed via Chebyshev's three term recurrence relations:

$$\cos(qk\Delta) = 2\cos(k\Delta)\cos((q-1)k\Delta) - \cos((q-2)k\Delta) \quad (13)$$

$$\sin(qk\Delta) = 2\cos(k\Delta)\sin((q-1)k\Delta) - \sin((q-2)k\Delta) \quad (14)$$

where q=2, . . . , n.

For computation of the elements of the regressor ψ via algorithms (13) and (14), two multiplications and one addition, multiplied by 2(n−1), are required.

Figure 4:
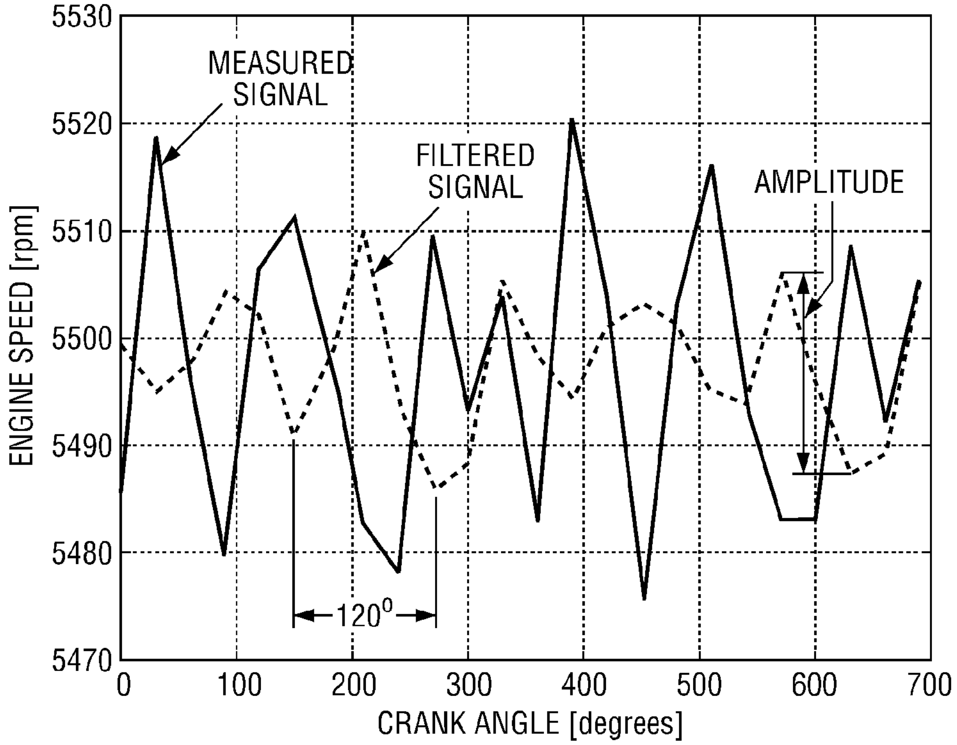
FIG. 4 is a plot of a measured engine speed signal and a filtered engine speed signal for a single engine cycle with a six cylinder engine, the data being shown at steps of 30 crank angle when the engine is not fueled.

FIG. 4 shows the result of the filtering. The engine speed signal is filtered by the filter (12). The engine is operating at 5500 rpm. It can be seen that the amplitude information is recovered on the signal, which is filtered by the filter (12).

Measurements with steps of 30 CA degrees on the six cylinder prototype engine are shown in FIG. 4, where a single engine cycle is plotted. The engine speed is plotted with a solid line. Relative load is 100%. The engine is not fueled. A filter signal corresponding to the firing frequency is plotted with dash line.

Figure 5:
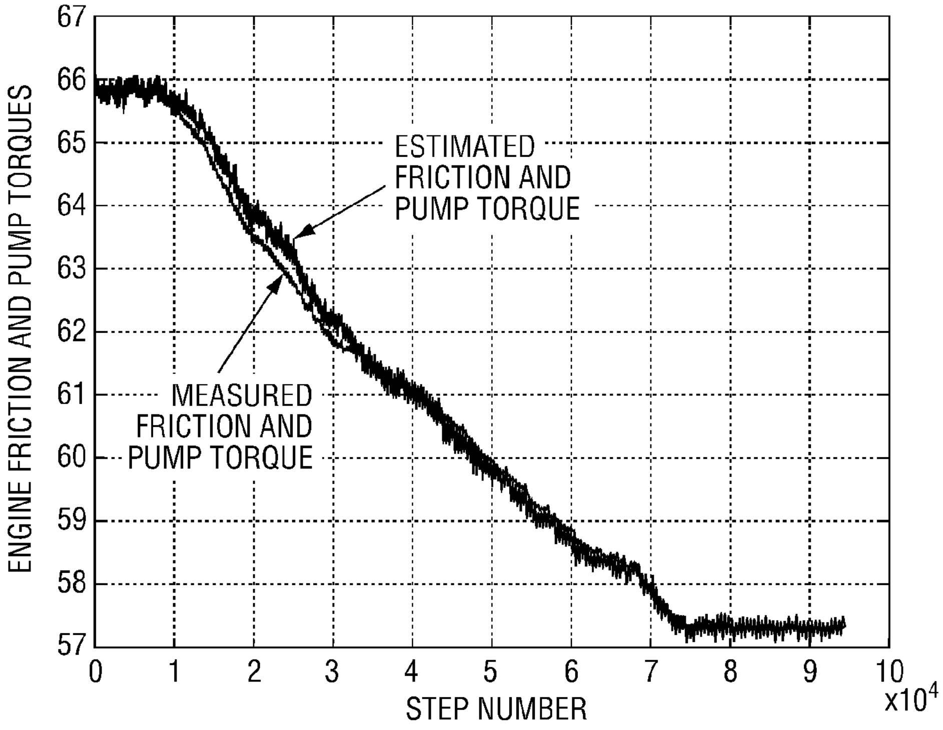
FIG. 5 is a plot of engine friction torque and pump torque as a function of a step number (each step is 30 crank angle degrees) for comparing measured torques with estimated torques.

The amplitude of a high resolution engine speed signal filtered at the engine firing frequency is correlated to engine losses (friction and pump losses). Wear and changes with time of the engine components affects the amplitude of the engine speed variations via friction forces on the piston assembly and piston acceleration, providing a mean for friction torque sensing. As seen in FIG. 5, amplitude of the engine speed variations is averaged, over a certain number of engine cycles with the purpose of improvement of the signal quality, and correlated to the engine losses at every rotational speed.

Figure 6:
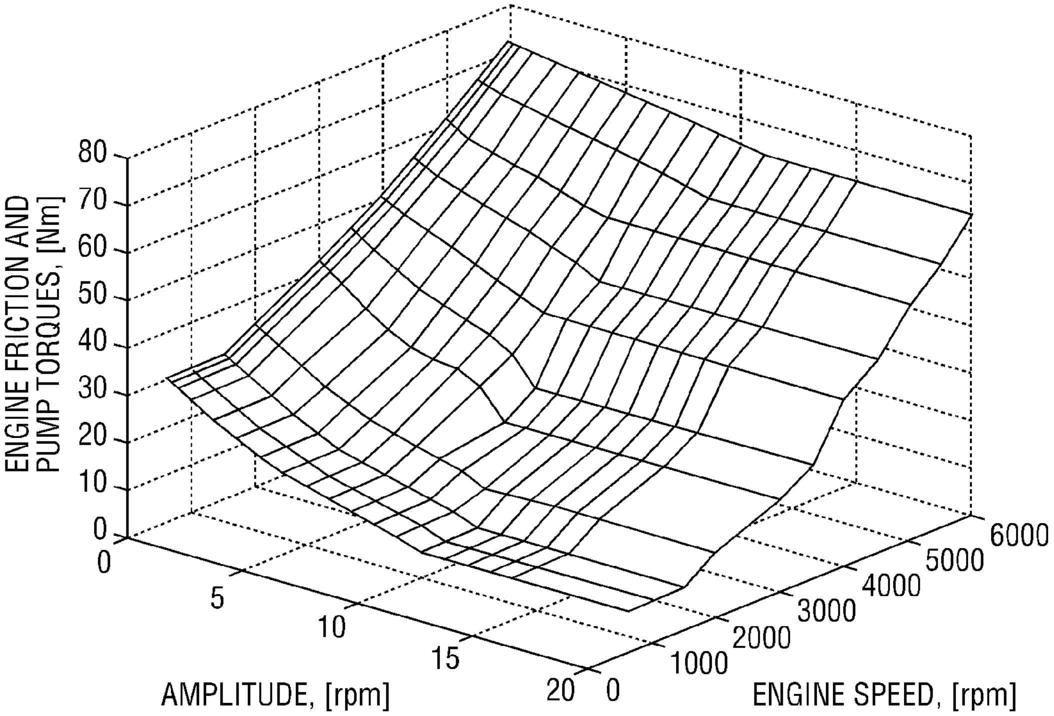
FIG. 6 is a three-dimensional plot of engine losses as a function of average amplitude and rotational speed.

FIG. 6 shows engine losses as a function of average amplitude and rotational speed.

In FIG. 5, engine speed is 5500 rpm. The engine is not fueled. Measured engine friction and pump torque is plotted with a dash dotted line and estimated torque is plotted with a solid line.

Figure 7:
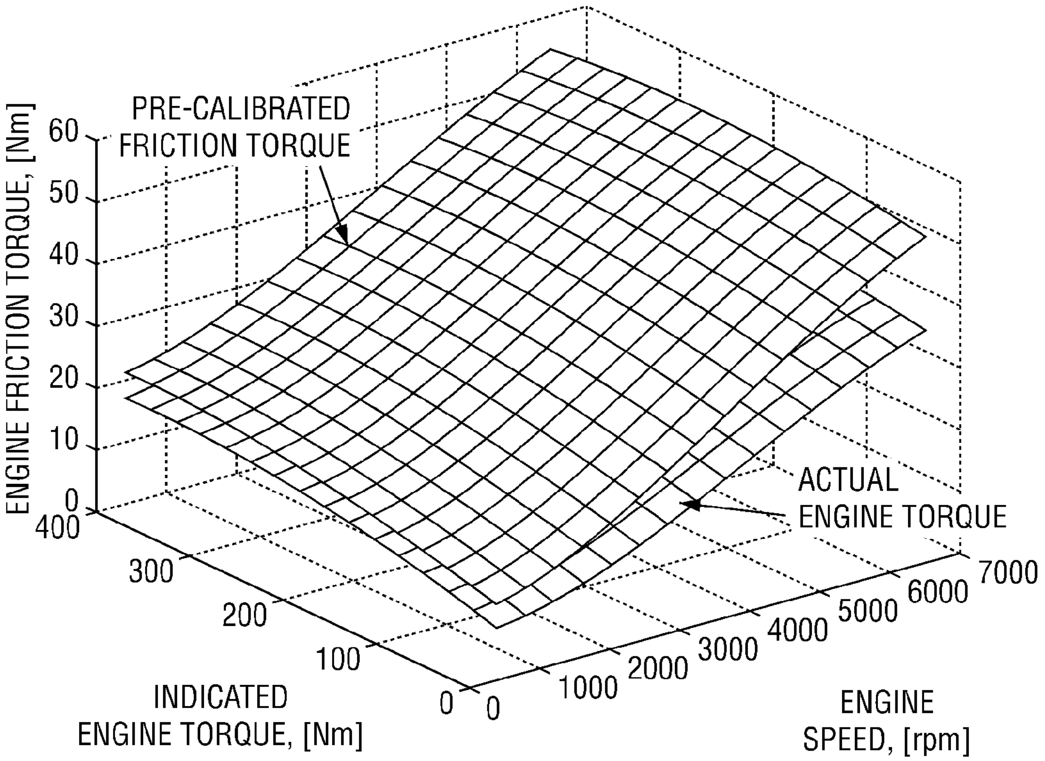
FIG. 7 is a three-dimensional plot of actual and pre-calibrated friction torques as functions of engine speed and indicated engine torque.

Suppose that the engine friction torque is overestimated; i.e., real friction torque is less, due to wearing of the engine components, than pre-calibrated friction torque. The difference between pre-calibrated friction torque and actual friction torque then increases with rotational speed. FIG. 7 shows three dimensional plots of actual and pre-calibrated friction torques as functions of engine speed and indicated engine torque.

Figure 8:
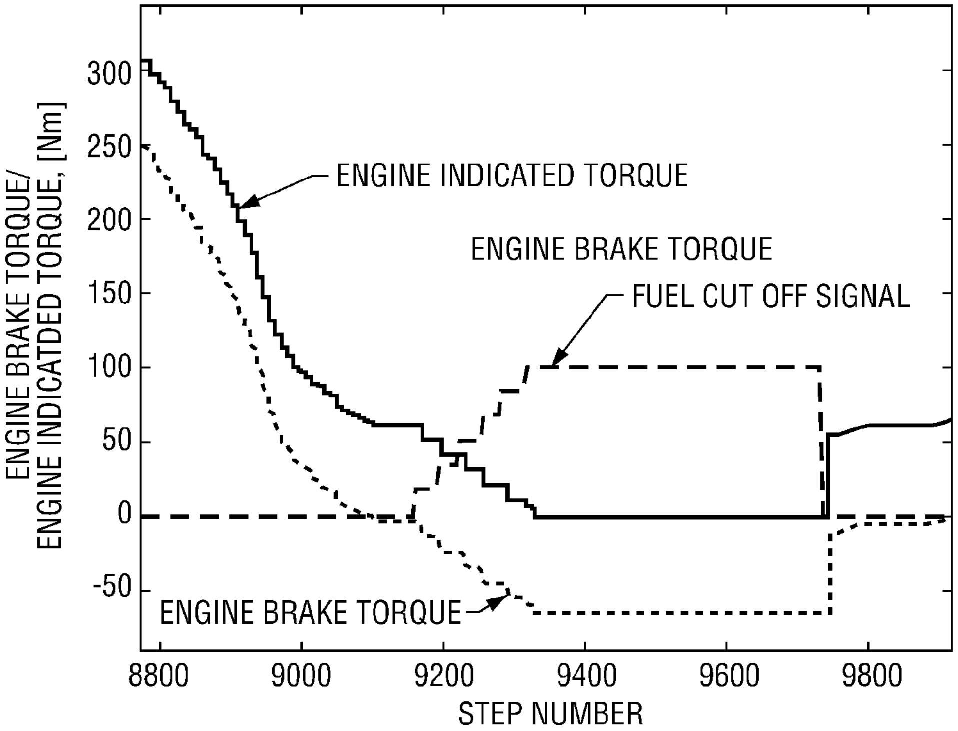
FIG. 8 is a plot of engine brake torque and engine indicated torque at various engine crank angle showing an engine fuel cut-off signal.
Figure 9:
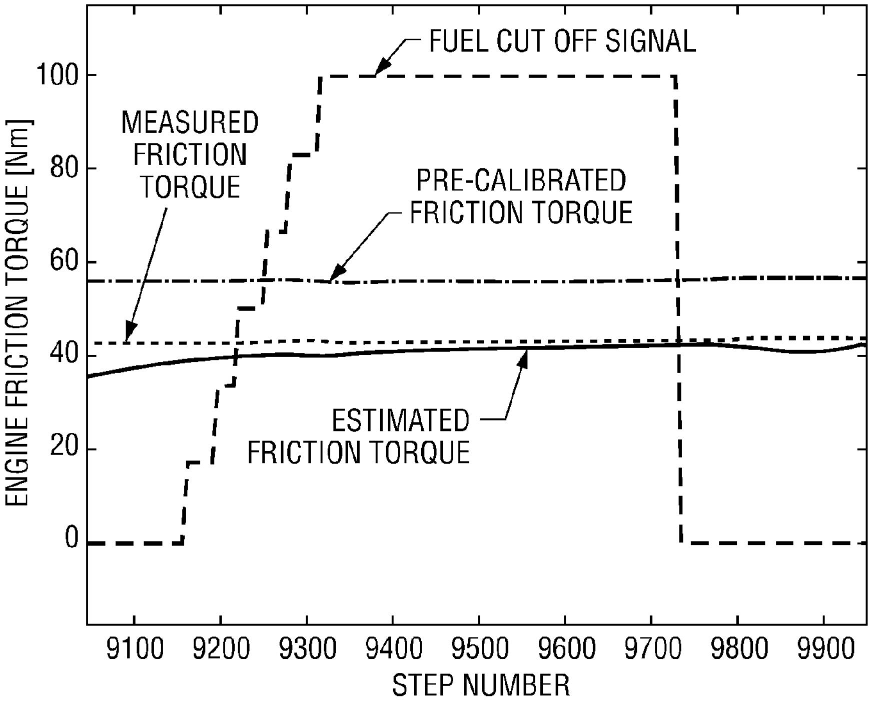
FIG. 9 is a plot of measured engine friction torque and pre-calibrated engine friction torque at various crank angles as well as a fuel cut-off signal.

FIG. 8 shows engine fuel cut-off operation at engine speed of 5500 rpm. Behavior of engine brake and indicated torques are shown during fuel cut-off, where engine brake torque is equal to a sum of engine friction and pump torques and indicated torque is equal to zero. FIG. 9 shows a behavior of friction torque estimated from crankshaft speed variations by using the approach described above. It also shows actual and pre-calibrated engine friction torques during fuel cut-off state. A significant difference between pre-calibrated and measured engine friction torques is indicated in FIG. 9.

An engine friction look-up table, whose output is pre-calibrated engine friction torque, should be adapted so that the difference between the output of look-up table and friction torque estimated from the crankshaft speed fluctuations is minimized. Adaptation algorithms are presented subsequently.

Measurements for FIG. 8 are on an engine when engine speed is 5500 rpm. Engine brake torque and indicated torque are plotted as functions of a step number. Each step is 30 CA degrees. Engine brake torque is plotted with a dotted line. Engine indicated torque is plotted with a solid line. A fuel cut-off signal is plotted with a dashed line. Total fuel cut-off is achieved if this signal is equal to 100.

Measurements for FIG. 9 also are on an engine when engine speed is 5500 rpm. Estimated engine friction torque, actual torque and pre-calibrated engine torque are plotted as functions of a step number. Each step is 30 CA degrees. Estimated engine friction torque is plotted with a solid line. Measured engine friction torque is plotted with dotted line. Pre-calibrated engine friction torque is plotted with dash-dotted line. A fuel cut-off signal is plotted with dashed line. Total fuel cut-off is achieved at step number 9300.

Adaptation of the Friction Torque Look-up Table Suppose that there is a look-up table describing a variable z as a function of two variables x and y. The look-up table is presented as a number of nodes ($x_h$,$y_p$), h=1, . . . D, p=1, . . . , G, where the output variable $z_{h,p}$ is defined. The values of the variable z between the nodes are computed via a linear interpolation. The problem of adaptation of the look-up table is reduced to calculation of an additive compensation term, which is based on the approximation (usually polynomial approximation) of the difference between new measured values of the operating parameter and values of the parameter calculated from the look-up table. As soon as this compensation term is calculated, it resides in the memory of the control unit in the form of coefficients of the polynomial, or added to the nodes $z_{h,p}$ of the look-up table.

Assume new measured data $x_{im}$, $y_{im}$, $z_{im}$ with a weighting factor $w_{im}$ are available, where i=1, . . . , N. The difference between a value of the parameter $z_i$, calculated via a look-up table, and a new measured value of the parameter $z_{im}$, is $\epsilon_i = z_i - z_{im}$. Assume that, in step k, k=2, . . . of the algorithm design $\epsilon_i$ is approximated by a function (generally nonlinear) f(x,y). An additional new term Δf(x,y), which is calculated by using a least-squares method, should be tested. Let it be assumed that f(x,y) has $c_{k-1}$ constraints and a function f(x,y)+Δf(x,y) has $c_k$ constraints. The following variances then can be calculated in step k−1 and k as follows:

$$V_{k-1} = \frac{1}{(N-c_{k-1})}\sum_{i=1}^{N}(\varepsilon_{im} - f(x_{im}, y_{im}))^2 w_{im} \tag{15}$$

$$V_k = \frac{1}{(N-c_k)}\sum_{i=1}^{N}(\varepsilon_{im} - f(x_{im}, y_{im}) - \Delta f(x_{im}, y_{im}))^2 w_{im} \tag{16}$$

The decision regarding inclusion of a new correction term $\Delta f(x,y)$ in the model is based on a comparison of variances $V_{k-1}$ and $V_k$. In order to include new term $\Delta f(x,y)$, $V_k$ should be significantly less than $V_{k-1}$. The test for comparison of two variances is a hypothesis test, where a hypothesis that two variances $V_{k-1}$ and $V_k$ are equal is taken as a null hypothesis ($H_0$:$V_{k-1}=V_k$). In order to reject null hypothesis $H_0$, the difference between $V_{k-1}$ and $V_k$ with degrees of freedom $f_1=N-c_{k-1}$, and $f_2=N-c_k$, and a level of significance p, should be significant. A probability of rejecting null hypothesis, when it is true, is defined as a level of significance, or $\alpha$ risk. The significance level should be chosen as a relatively small value in order to reduce the probability of rejecting the null hypothesis mistakenly. The null hypothesis $H_0$ can be tested provided that the approximation errors are normally distributed in each step of the regression. F-distribution is used for hypothesis testing of equal variances. The reduction of variance can be considered statistically significant, if $$\frac{V_{k-1}}{V_k} > F_{(1-p)}, \tag{17}$$

where a number $F_{(1-p)}$ is taken from an "F-distribution" look-up table for degrees of freedom $f_1=N-c_{k-1}$ and $f_2=N-c_k$, and a level of significance p, which is chosen beforehand. If inequality (17) is valid, then the term $\Delta f(x,y)$ is included in the model.

The decision making procedure, which is based on the F test, could be sensitive to outlying observations. In this case, a robust step-wise regression can be applied to achieve robustness against the presence of outliers.

The method described above is able to reject a certain term. Instead of this term, however, another term might significantly reduce an approximation error. The process is stopped if a corresponding variance and a variance of a measurement noise are approximately the same.

Let it be assumed that $\epsilon_i$ can be approximated with a linear (with respect to parameters) function of two variables; i.e., $$\hat{\epsilon}=\phi^T\theta, \tag{18}$$

$$\text{where } \phi=[1,y,x,y^2,y^3, \ldots, x^n y^n]^T$$

$$\theta=[a_0,a_1,a_2, \ldots, a_{(n+1)^2}]^T, \text{ and} \tag{19}$$

where $\hat{\epsilon}$ is an estimate of $\epsilon$, and n is an order of the polynomial.

The order of the variables in $\phi$ plays an important role, since it decides the test order of new candidate terms, which should be included in the model. A correct sequence of candidates minimizes the computational burden. Output variable z is a function of two variables, x and y, but often the dependence on one of the variables is stronger than the dependence on the other variable. For example, the dependence of the friction torque on engine speed is more significant than its dependence on indicated engine torque. Moreover, second order term of engine speed might also be tested for inclusion in the model. If an output variable z significantly depends on one of the variables, and this dependence can be described as a polynomial of a certain order, the terms in model (18) should be placed so that the order of the polynomial increases when the new term is added. Since the model (18) is an additive compensation to the look-up table, very often it has linear terms only. Moreover, if a number of measured points is sufficiently large, then the number of constraints is negligible [for model (18) the number of constraints is the same as the number of the coefficients]. In real-time applications, where the number of measured points very often is not large, each additional constraint has a significant impact on a variance. Therefore, it is advisable to reduce the number of the coefficients in approximating the polynomial by taking into account physical dependencies via suitable parameterization. For example, the volumetric efficiency model can be parameterized (linearized) by introducing volumes occupied by fresh air and by a residual gas as new independent variables. Such a parameterization might essentially reduce the number of parameters to be adapted since volumetric efficiency is a linear function of the volumes occupied by fresh air and by a residual gas. It is worth noting that such parameterizations, which linearize the operating parameter as a function of newly introduced independent variables, can be found in some special cases only.

The order of the coefficients presented in (18) can be seen merely as a typical example. First of all, linear terms are tested; and assuming that the output variable z depends significantly on variable y, the terms proportional to $y^2$, $y^3$, etc. are added. The algorithm described below is based on subsequent calculation of the coefficients of polynomial (18), and evaluation of the variance in every step. The algorithm can be divided in the following steps:

Step 1. In the first step, the order of the approximating polynomial is zero (n=0). The following performance index is minimized:

$$S_1 = \sum_{i=1}^{N}(\varepsilon_i - \theta_1)^2 w_{im}, \tag{20}$$

where new notation $\theta_1=a_0$ is used for simplicity. By minimizing (20). $\theta_1$ is calculated as follows:

$$\theta_1 = \frac{\sum_{i=1}^{N}(\varepsilon_i w_{im})}{\sum_{i=1}^{N} w_{im}}. \tag{21}$$

The value of the performance index is calculated by substituting (21) in $S_1$. Assuming that measurement errors in measured data $\epsilon$ are independent and are normally distributed by a variance $\sigma^2/w_{im}$, performance index (20) has an average value (mathematical expectation) of:

$$MS_1=\sigma^2(N-1). \tag{22}$$

Therefore, for sufficiently large N, the following ratio:

$$V_1 = \frac{S_1}{N-1} \tag{23}$$

is an estimate of variance $\sigma^2$.

Step 2. In this step the approximation error is reduced by introducing a coefficient $a_1$. Denote $\theta_2=[a_0\ a_1]^T$, and $\phi_2=[1y]^T$. The polynomial has the following form: $\hat{\epsilon}=\theta_1+\phi_2^T\theta_2$. Notice that the offset parameter $a_o$ is estimated twice via $\theta_1$ and $\theta_2$. In other words, the estimate of the offset is improved in this step.

The following performance index is minimized in this step:

$$S_2 = \sum_{i=1}^{N} (\varepsilon_i - (\theta_1 + \varphi_{2i}^T\theta_2))^2 w_{im}, \tag{24}$$

where $\theta_1$ is calculated via (21). Parameter vector $\theta_2$ is updated as follows:

$$\theta_2 = \left[\sum_{i=1}^{N} (\varphi_{2i}\varphi_{2i}^T w_{im})\right]^{-1} \sum_{i=1}^{N} (\varepsilon_i - \theta_1)\varphi_{2i} w_{im} \tag{25}$$

The value of the performance index (24) is calculated by substituting (25) and (24). The linear regression model $\hat{\epsilon}_2=\phi_2^T\theta_2$, where $\hat{\epsilon}_2=\hat{\epsilon}-\theta_1$, can also be written in the following form:

$$\hat{\varepsilon}_2 - \bar{\varepsilon}_2 = r\frac{s_e}{s_y}(y - \bar{y}), \tag{26}$$

where $\bar{\epsilon}_2$ and $\bar{y}$ are average values of $\epsilon_{2i}$ and $y_i$, respectively, $s_y^2$ and $s_e^2$ are variances, respectively, and r is a correlation coefficient. These variables are defined in Appendix B. Correlation coefficient r is an indicator of how close the relationship is between $\hat{\epsilon}_2$ and y to linear relation. An absolute value of the correlation coefficient is less than one. Sample correlation coefficient r is a biased estimate of a theoretical correlation coefficient, and converges to a theoretical correlation coefficient when a number of measured points N tends to infinity.

If there is one measured point in the data set that is suspected to be an outlier, the following test could be performed in order to remove this point. Variances $s_y^2$ and $s^{e2}$ and correlation coefficient r are calculated using all the points, and the same variances $\tilde{s}_y^2$ and $\tilde{s}_e^2$ and correlation coefficient $\tilde{r}$ are calculated using all the points without a suspected point. Then the value of the following ratio $$R = \frac{(N-1)^2\tilde{s}_y^2\tilde{s}_e^2(1-\tilde{r}^2)}{N^2 s_y^2 s_e^2(1-r^2)}$$

is compared with a critical value for a certain confidence level. If the value of the ratio is below a critical value, the suspected measured point is identified as an outlier and removed from the data set.

Performance index (24) can be calculated by taking into account (47)-(49), as follows:

$$S_2 = \sum_{i=1}^{N} (\varepsilon_i - (\theta_1 + \varphi_{2i}^T\theta_2))^2 w_{im} = (N-1)s_e^2(1-r^2). \tag{27}$$

An estimate of variance $\sigma^2$ can be calculated as follows:

$$V_2 = \frac{S_2}{N-2}. \tag{28}$$

By comparing $V_1$ and $V_2$, it is possible to make a decision about inclusion of the term $\phi_2^T\theta_2$. In order to include the new term in (18), $V_2$ should be significantly less than $V_1$. Namely, a reduction of variance can be considered significant, if $$\frac{V_1}{V_2} > F_{(1-p)}, \tag{29}$$

where a number $F_{(1-p)}$ is taken from an F-distribution look-up table for degrees of freedom $f_1$=N−1, $f_2$=N−2, and chosen significance level p. If inequality (29) is valid, then the term $\phi_2^T\theta_2$, is included in the model (18).

Since $\epsilon$ is a function of two variables x and y, a repetition of the present step might be needed in some cases. This could be done by redefining $\theta_2=[a_0\ a_2]^T$ and $\phi_2=[1\ x]^T$, and verifying inequality (29). By comparing correlation coefficients and an estimate of variance, it is possible to make a choice variable x and y that is more correlated with z.

Step 3. In this step the approximation error is reduced by introducing a coefficient $a_2$. Denote $\theta_3=[a_0\ a_1\ a_2]^T$ and $\phi_3=[1\ y\ X]^T$. Polynomial (18) has the following form: $\hat{\epsilon}=\theta_1+\phi_2^T\theta_2+\phi_3^T\theta_3$.

The following performance index is minimized in this step:

$$S_3 = \sum_{i=1}^{N} (\varepsilon_i - (\theta_1 + \varphi_{2i}^T\theta_2 + \varphi_{3i}^T\theta_3))^2 w_{im}, \tag{30}$$

where $\theta_1$ and $\theta_2$ are calculated via (21), (25). Parameter vector $\theta_3$ is updated as follows:

$$\theta_3 = \left[\sum_{i=1}^{N} (\varphi_{3i}\varphi_{3i}^T w_{im})\right]^{-1} \sum_{i=1}^{N} (\varepsilon_i - (\theta_1 + \varphi_{2i}^T\theta_2)\varphi_{3i} w_{im} \tag{31}$$

The value of the performance index (30) is calculated by substituting (31) in (30). Linear regression model $\hat{\epsilon}_3=\phi_3^T\theta_3$, where $\hat{\epsilon}_3=\epsilon-\theta_1-\phi_2^T\theta_2$, can also be written in the following form:

$$\hat{\varepsilon}_3 - \overline{\varepsilon}_3 = b_{ex}(x - \overline{x}) + b_{ey}(y - \overline{y}) \tag{32}$$

$$b_{ex} = \frac{r_{xe} - r_{xy}r_{ye}}{1 - r_{xy}^2}\frac{s_e}{s_x} \tag{33}$$

$$b_{ey} = \frac{r_{ye} - r_{xy}r_{xe}}{1 - r_{xy}^2}\frac{s_e}{s_y}, \tag{34}$$

where $\overline{\epsilon}_3, \overline{x}$ and $\overline{y}$ are average values of $\epsilon_{3i}$, $x_i$ and $y_i$, respectively, $r_{xe}$, $r_{xy}$ and $r_{ye}$ are correlation coefficients (defined in Appendix C) between pairs $x\epsilon_3$, $xy$ and $y\epsilon_3$, respectively, $S_e$, $S_y$ and $S_x$ are variances defined in Appendix C.

Performance index (30) can be calculated by taking into account (32)-(34), as follows:

$$S_3 = \sum_{i=1}^{N}(\varepsilon_i - (\theta_1 + \varphi_{2i}^T\theta_2 + \varphi_{3i}^T\theta_3))^2 w_{im} = (N-1) \tag{35}$$
$$(s_e^2 + b_{ex}^2 s_x + b_{ey}^2 s_y - 2b_{ex}s_e s_x r_{xe} - 2b_{ey}s_e s_x r_{ye} + 2b_{ex}b_{ey}s_x s_y r_{xy})$$

An estimate of variance $\sigma^2$ can be calculated as follows:

$$V_3 = \frac{S_3}{N-3}. \tag{36}$$

By comparing $V_2$ and $V_3$, it is possible to make a decision regarding inclusion of the term $\phi_3{}^T\theta_3$. In order to include a new term in (18), $V_3$ should be significantly less than $V_2$. Namely, a reduction of variance can be considered significant, if $$\frac{V_2}{V_3} > F_{(1-p)}, \tag{37}$$

where $F_{(1-p)}$ is taken from an "F-distribution" look-up table for degrees of freedom $f_2$=N−2, $f_3$=N−3, and chosen significance level p. If inequality (37) is valid, then the term $\phi_3{}^T\theta_3$, is included in the model (18), and the next step is taken. The parameters $\theta_k$, k=4, . . . , $(n+1)^2$ can be calculated recursively via the parameters in step k−1, $\theta_{k-1}$. The next step is calculation of parameters $\theta_k$, via $\theta_{k-1}$.

Step k. The performance index in step k is defined as follows:

$$S_k = \sum_{i=1}^{N}(\varepsilon_i - (\theta_1 + \varphi_{2i}^T\theta_2 + \ldots + \varphi_{ki}^T\theta_k))^2 w_{im} \tag{38}$$

Parameter vector $\theta_k$ which minimizes performance index (38), is the following:

$$\theta_k = \left[\sum_{i=1}^{N}(\varphi_{ki}\varphi_{ki}^T w_{im})\right]^1 \sum_{i=1}^{N}(\varepsilon_i - (\theta_1 + \varphi_{2i}^T\theta_2 + \ldots + \varphi_{(k-1)i}^T\theta_{k-1}))\varphi_{ki}w_{im}, \tag{39}$$

where $\phi_k=[\phi_{k-1}\phi(k)]^T$, $\theta_k=[\theta_{k-1}\theta(k)]^T$.

Parameter vector $\theta_k$ is calculated via a parameter vector $\theta_{k-1}$, which is defined as follows:

$$\theta_{k-1} = \left[\sum_{i=1}^{N}(\varphi_{(k-1)i}\varphi_{(k-1)i}^T w_{im})\right]^{-1} \sum_{i=1}^{N}(\varepsilon_i - (\theta_1 + \ldots + \varphi_{(k-2)i}^T\theta_{k-2}))\varphi_{(k-1)i}w_{im}. \tag{40}$$

Straightforward calculations show that $\theta_k$ is calculated as follows:

$$\theta_k = \begin{bmatrix} \theta_{k-1} + \dfrac{A_{k-1}^{-1}\upsilon\upsilon^T\theta_{k-1}}{\alpha} + \left[A_{k-1}^{-1} + \dfrac{A_{k-1}^{-1}\upsilon\upsilon A_{k-1}^{-1}}{\alpha}\right]\delta b - \dfrac{A_{k-1}^{-1}\upsilon b_1}{\alpha} \\ -\dfrac{\upsilon^T}{\alpha}\theta_{k-1} - \dfrac{\upsilon^T A_{k-1}^{-1}\delta b}{\alpha} + \dfrac{b_1}{\alpha} \end{bmatrix},$$

where $A_{k-1}{}^{-1} \epsilon R^{(k-1)\cdot(k-1)}$ matrix, $u \epsilon R^{k-1}$ and $\delta b \epsilon R^{k-1}$, $\alpha \epsilon R^1$ and $b_1 \epsilon R^1$, defined in Appendix D.

An estimate of variance $\sigma^2$ can be calculated as follows:

$$V_k = \frac{S_k}{N-k} \tag{41}$$

The step-wise regression method can be seen as a recursive method for estimation of the variance of the measurement noise $\sigma^2$ by means of the sequence of the variances $V_1$, $V_2$, . . . , $V_k$, where each next variance is less than the previous one. The recursion is stopped if the corresponding variance and variance of the measurement noise are approximately the same or all the variables are used up.

By comparing $V_{k-1}$ and $V_k$, it is possible to make a decision regarding inclusion of the term $\phi_k{}^T\theta_k$. In order to include a new term in (18), $V_k$ should be significantly less than $V_{k-1}$. Namely, a reduction of variance can be considered significant, if $$\frac{V_{k-1}}{V_k} > F_{(1-p)}, \tag{42}$$

where $F_{(1-p)}$ is taken from an "F-distribution" look-up table for degrees of freedom $f_{k-1}$=N−(k−1), $f_k$=N−k, and chosen significance level p. If inequality (42) is valid, then the term $\phi_k{}^T\theta_k$, is included in the model (18).

Figure 10:
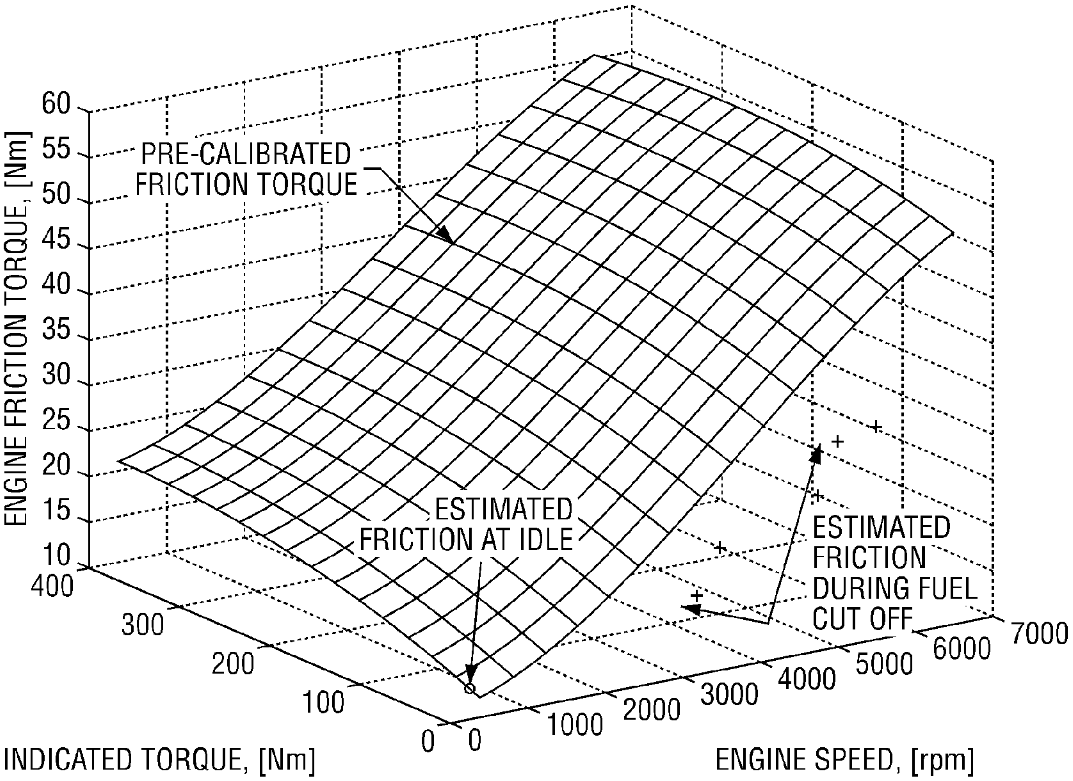
FIG. 10 is a three-dimensional plot of estimated and pre-calibrated engine friction torque as a function of engine speed and indicated engine torque during fuel cut-off and during idle.

Suppose that there is a set of measurements of the engine friction torque made during engine fuel cut-off state and during engine idle. FIG. 10 shows pre-calibrated engine friction torque as a function of engine speed and indicated engine torque. Measured values of the engine friction torque during a fuel cut-off state are shown with plus signs. The value of the engine friction torque obtained during idle is shown with a round sign, which is added.

Figure 11:
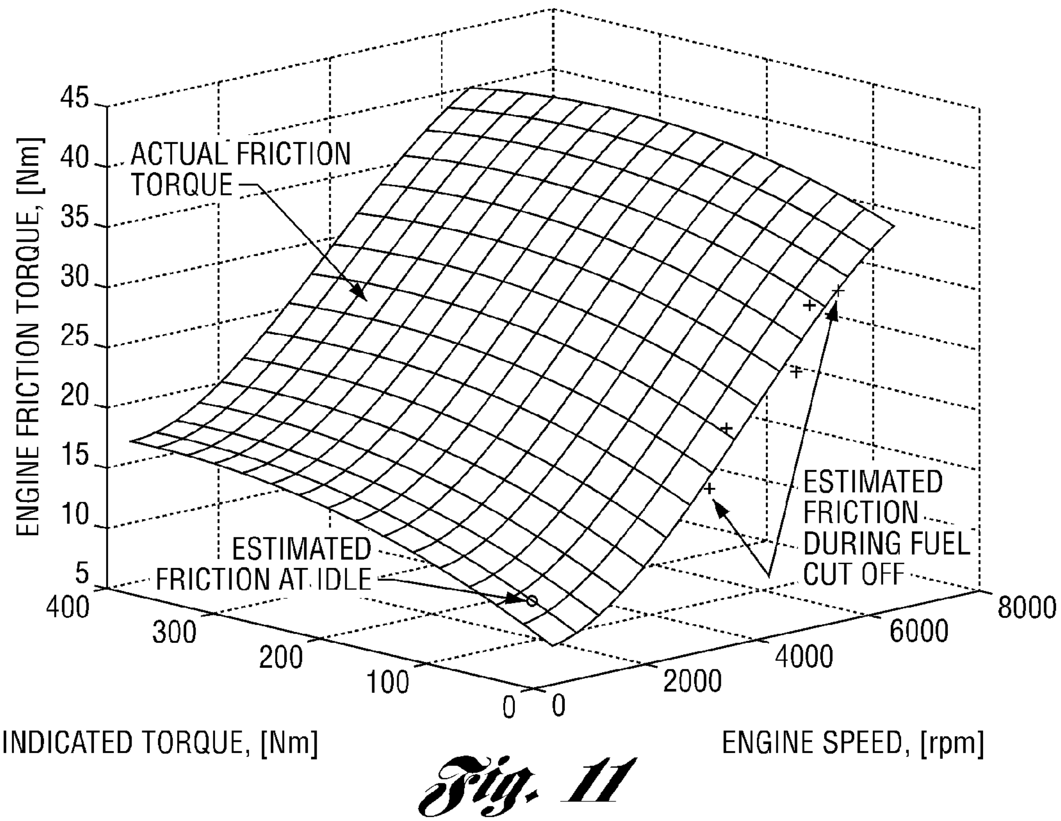
FIG. 11 is a three-dimensional plot of actual friction torque as a function of rotational speed and indicated torque.

FIG. 11 shows actual friction torque as a function of rotational speed and indicated torque. Measured values of the engine friction torque during fuel cut-off state are shown with plus signs. The value of the engine friction torque obtained during idle is shown with a round sign added. Notice that, new values of estimated engine friction torque obtained during a fuel cut-off state are available at high rotational speeds (the fuel cut-off is activated at high speeds only) and zero indicated torque. Estimation of the friction torque at idle gives a new measured value of the friction torque at low speed and indicated torque. Therefore, an offset and gradient in the engine speed direction can be estimated by using new measured values of the engine friction torque.

Adaptation algorithms described above are applied for adaptation of an engine friction look-up table. In this case, an operating parameter z is engine friction torque, which is a function of two variables; i.e., engine speed y and indicated engine torque x. As can be seen from FIG. 10, new values of estimated engine friction torque obtained during a fuel cut-off state are available at high rotational speeds (the fuel cut-off is activated at high speeds only) and zero indicated torque. Estimation of the friction torque at idle gives a new measured value of the friction torque at low speed and indicated torque. Therefore, an offset and gradient in the engine speed direction can be updated by using new measured values of the engine friction torque. Hence, model (18) is defined with $$\phi=[1,y,x]^T$$

$$\theta=[a_0,a_1,a_2]^T \tag{43}$$

Figure 12:
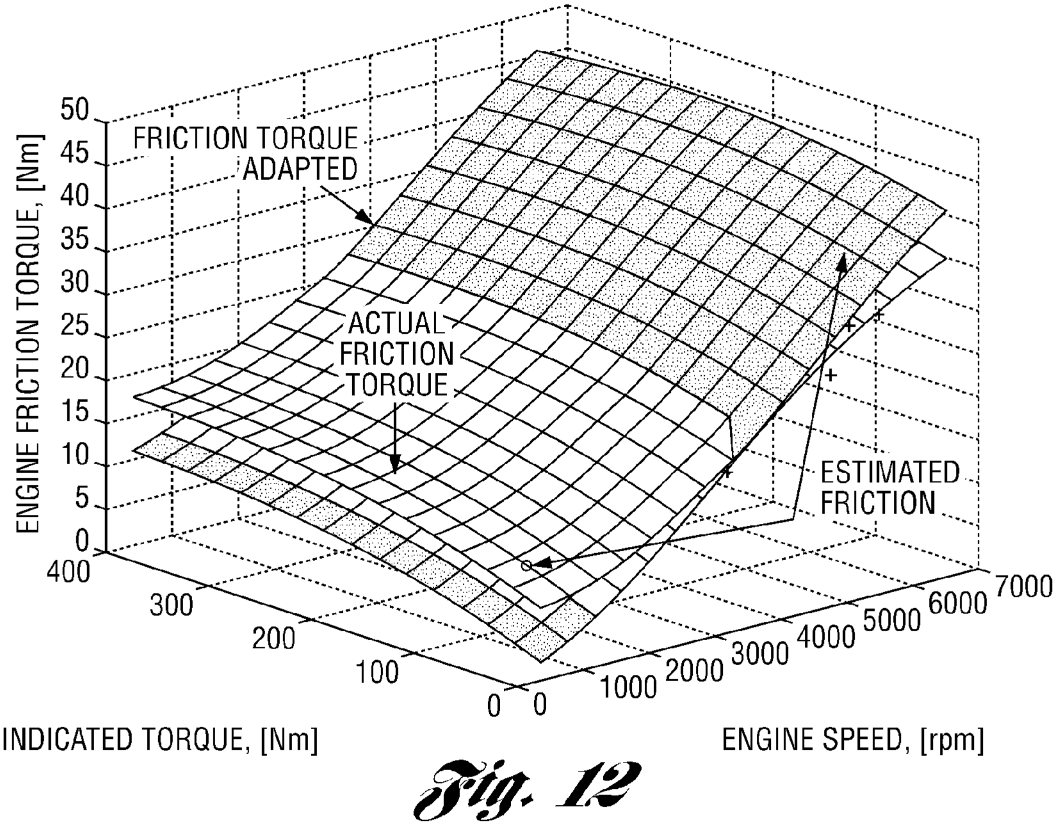
FIG. 12 is a three-dimensional plot of actual engine friction torque and adapted engine friction torque as a function of engine speed and indicated engine torque.

In a first step, $\theta_1$ is computed according to (21), $\theta_1=-9.9$ [Nm], and $V_1$ is computed according to (23); i.e., $V_1=16.65$ $[Nm]^2$. The result of adaptation is shown in FIG. 12, which shows significant deviation between actual engine friction torque and adapted friction torque. Therefore, the next step is taken. Actual engine friction torque as a function of engine speed and indicated engine torque is plotted in FIG. 12 as a white surface. Friction torque adapted in Step 1 is plotted as a gray surface. Measured values of the engine friction torque during a fuel cut-off state are shown with plus signs. The value of the engine friction torque obtained during idle is shown with a round sign, which is added.

In a second step, the term $a_1y$ is tested as a candidate term for inclusion in the model (18). A parameter vector is defined as follows: $\theta_2=[a_0\ a_1]^T$, and $\phi_2=[1y]^T$. Parameter vector $\theta_2$ is computed according to (25) or (26). Then $a_0=7.98$ [Nm] and $$a_1=-2.12\left[\frac{Nm}{rpm}\right].$$

Variance $V_2$ is calculated according to (28), and $V_2=3.27$ $[Nm]^2$. Ratio $$\frac{V_1}{V_2}=5.09$$

should be compared with the F value, which is equal to 4.05 for degrees of freedom $f_1=5$ and $f_2=4$, and significance level $p=0.1$. Since $$\frac{V_1}{V_2}>F_{(1-p)},$$

the term $\phi_2{}^T\theta_2$ is included in the model. In this step, the process should be stopped since the variance $V_2=3.27$ $[Nm]^2$ is close to the variance of measurement noise $\sigma=2.37$ $[Nm]^2$. Finally, the model has the following form $\hat{\epsilon}=\theta_1+\phi_2{}^T\theta_2=-9.9+(7.98-2.12y)$.

In a third step, the attempt to reduce an approximation error by introducing the term $a_2x$. Denote $\theta_3=[a_0\ a_1\ a_2]^T$ and $\phi_3=[1y\ x]^T$. Polynomial (18) has the following form: $\epsilon=\theta_1+\phi_2{}^T\theta_2+\phi_3{}^T\theta_3$. After calculation of $\theta_3$ according to (31), a variance can be calculated according to (36), $V_3=4.36$ $[Nm]^2$. Variance $V_3$ is larger than variance $V_2$, despite the fact that mean square error $S_3$ is slightly less than $S_2$ ($S_2=13.11$ $Nm^2$ and $S_3=13.09$ $Nm^2$). This is due to an additional constraint (coefficient $a_2$) introduced in Step 3. Since the variance $V_3$ is larger than the variance $V_2$, the term $\phi_3{}^T\theta_3$ is not accepted in the model (18).

Figure 13:
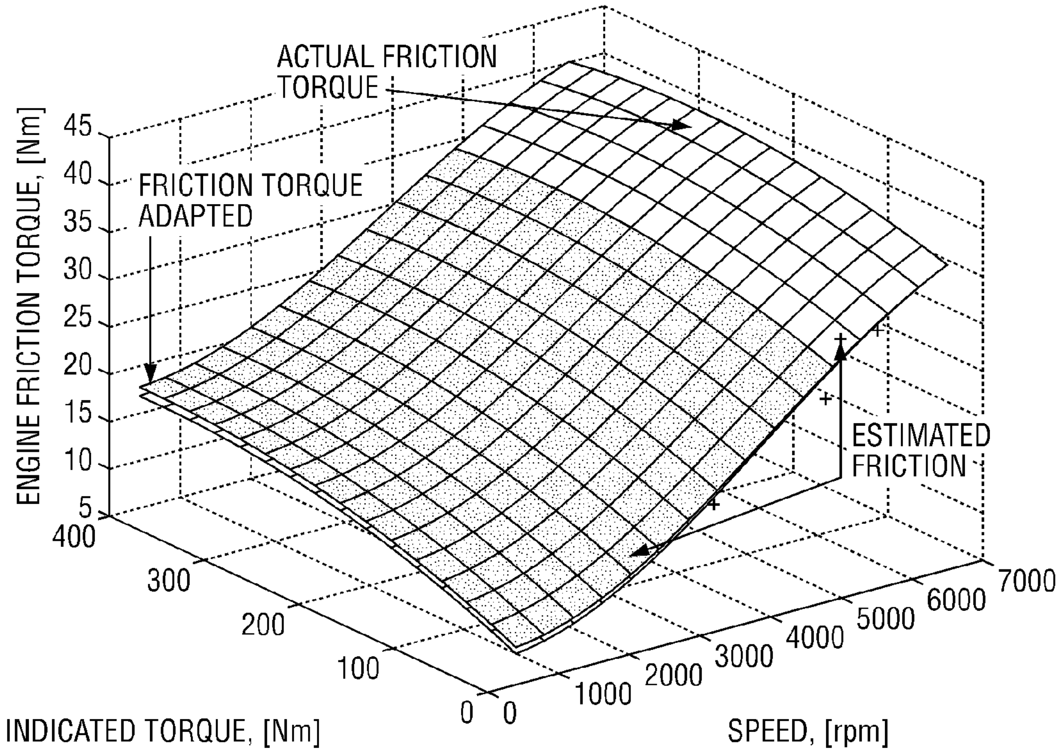
FIG. 13 is a three-dimensional plot of actual, adopted and estimated engine friction torque as a function of engine speed and indicated engine torque.

The result of the adaptation is indicated in FIG. 13, which shows significant improvement compared with FIG. 12. Actual engine friction torque as a function of engine speed and indicated engine torque is plotted in FIG. 13 as a white surface. Friction torque adapted in Step 2 is plotted as a gray surface. Measured values of the engine friction torque during fuel cut-off state are shown with plus signs. The value of the engine friction torque obtained during idle is shown with a round sign, which is added.

Figure 14:
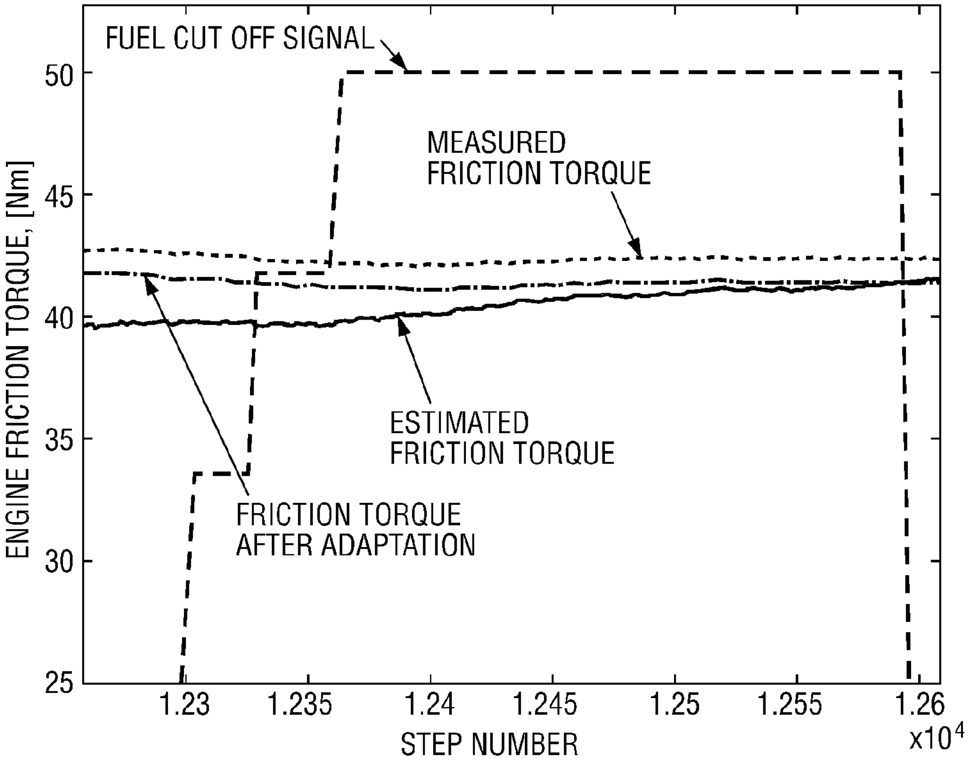
FIG. 14 is a plot of engine behavior during fuel cut-off operation wherein measured engine friction torque and adapted engine friction are compared.

The look-up table of the friction torque is updated in the electronic control unit, and FIG. 14 shows engine behavior during fuel cut-off operation. It can be seen that engine friction torque estimated from crankshaft speed variations by using the approach described above makes actual and adapted engine friction torques approximately the same during fuel cut-off.

In FIG. 14, measurements are made on an engine when engine speed is 5500 rpm. Estimated friction torque, measured friction torque and engine friction torque after adaptation are plotted as functions of a step number. Each step is 30 CA degrees. Estimated engine torque is plotted with a solid line. Measured engine friction torque is plotted with a dotted line. Adapted engine torque is plotted with a dash-dotted line. The fuel cut-off signal is plotted with a dashed line. Total fuel cut-off is achieved at step number $1.236\times10^4$.

Appendix A

Consider the following Lyapunov function candidate $$V_k=\|\tilde{\partial}_k\|^2 \tag{44}$$

where $\tilde{\partial}_k=\partial_k-\partial_*$, where $\partial_*$ is the vector of true parameters. Evaluating $V_k-V_{k-1}$ and taking into account that the following is true for the update law (10)

$$\begin{cases}\tilde{\partial}_k-\tilde{\partial}_{k-1}=-\dfrac{\psi_k}{\psi_k^T\psi_k}\tilde{\partial}_{k-1}^T\psi_k\\ \tilde{\partial}_k^T\psi_k=0\\ \psi_k^T\psi_k=n+1\end{cases}$$

one gets $$V_k-V_{k-1}=-\frac{\left(\tilde{\partial}_{k-1}^T\psi_k\right)^2}{(n+1)} \tag{45}$$

Thus the boundaries of the parameter error $\tilde{\partial}$ are established. The parameters $\partial$ converge to their true values $\partial_*$, if the regressor $\psi$ is persistently exciting, i.e., if there exist positive constants $\alpha$, $\beta$ and L such that the following inequality holds:

$$0 < \alpha I \le \sum_{k=r}^{r+L} \psi_k \psi_k^T \le \beta I \tag{46}$$

where r=1, 2, . . . is the step number, L is the size of the window and I is (2n+1)×(2n+1) unity matrix, where n is the number of the frequencies involved. Straightforward calculations show that there exists a sufficiently large L such that the matrix $\Sigma_{k=r}^{r+L}\psi_k\psi_k^T$ is strictly diagonally dominant, has positive eigenvalues only and (46) holds. Thus, the adjustable parameters □ converge to their true values $\partial_*$ Appendix *B*

$$\bar{\varepsilon}_2 = \frac{\sum_{i=1}^{N} (\varepsilon_i - \theta_1) w_{im}}{\sum_{i=1}^{N} w_{im}}, \quad \bar{y} = \frac{\sum_{i=1}^{N} y_i w_{im}}{\sum_{i=1}^{N} w_{im}} \tag{47}$$

$$s_y^2 = \frac{1}{N-1} \sum_{i=1}^{N} (y_i - \bar{y})^2, \quad s_e^2 = \frac{1}{N-1} \sum_{i=1}^{N} (\varepsilon_{2i} - \bar{\varepsilon}_2)^2 \tag{48}$$

$$r = \frac{1}{s_e s_y} \frac{1}{N-1} \sum_{i=1}^{N} (y_i - \bar{y})(\varepsilon_{2i} - \bar{\varepsilon}_2) \tag{49}$$

Appendix *C*

$$r_{xy} = \frac{1}{s_x s_y} \frac{1}{N-1} \sum_{i=1}^{N} (x_i - \bar{x})(y_i - \bar{y}), \tag{50}$$

$$r_{xe} = \frac{1}{s_x s_e} \frac{1}{N-1} \sum_{i=1}^{N} (x_i - \bar{x})(\varepsilon_{3i} - \bar{\varepsilon}_{3i})$$

$$r_{ye} = \frac{1}{s_y s_e} \frac{1}{N-1} \sum_{i=1}^{N} (y_i - \bar{y})(\varepsilon_{3i} - \bar{\varepsilon}_3) \tag{51}$$

$$s_y^2 = \frac{1}{N-1} \sum_{i=1}^{N} (y_i - \bar{y}), \quad s_e^2 = \frac{1}{N-1} \sum_{i=1}^{N} (\varepsilon_{3i} - \bar{\varepsilon}_3)^2 \tag{52}$$

$$s_x^2 = \frac{1}{N-1} \sum_{i=1}^{N} (x_i - \bar{x})^2, \quad \bar{\varepsilon}_3 = \frac{\sum_{i=1}^{N} (\varepsilon_i - \theta_1 - \varphi_{2i}^T \theta_2) w_{im}}{\sum_{i=1}^{N} w_{im}} \tag{53}$$

$$\bar{y} = \frac{\sum_{i=1}^{N} y_i w_{im}}{\sum_{i=1}^{N} w_{im}}, \quad \bar{x} = \frac{\sum_{i=1}^{N} x_i w_{im}}{\sum_{i=1}^{N} w_{im}} \tag{54}$$

Appendix *D*

$$A_{k-1} = \sum_{i=1}^{N} [\varphi_{k-1} \varphi_{k-1}^T] w_{im}, \quad \upsilon = \sum_{i=1}^{N} \varphi_{k-1} \varphi(k) w_{im}$$

$$a = \sum_{i=1}^{N} \varphi^2(k) w_{im}, \quad b_1 = \sum_{i=1}^{N} (\varepsilon_i - (\theta_1 + \varphi_2^T \theta_2 + \ldots + \varphi_{k-2}^T \theta_{k-2} + \varphi_{k-1}^T \theta_{k-1})) \varphi(k) w_{im}$$

$$\delta b = -\sum_{i=1}^{N} (\varphi_{k-1}^T \theta_k \varphi_{k-1}) w_{im}, \quad \alpha = a - \upsilon^T A_{k-1}^{-1} \upsilon$$

Matrix $A_k^{-1}$ is computed via $A_{k-1}^{-1}$ according to the following formula:

$$A_k^{-1} = \begin{bmatrix} A_{k-1}^{-1} + \dfrac{A_{k-1}^{-1} \upsilon \upsilon^T A_{k-1}^{-1}}{\alpha} & -\dfrac{A_{k-1}^{-1} \upsilon}{\alpha} \\ -\dfrac{\upsilon^T}{\alpha} A_{k-1} & \dfrac{1}{\alpha} \end{bmatrix}$$

where $A_k = \Sigma_{i=1}^{N}[\phi_k \phi_k^T] w_{im}$.

While the best mode for carrying out the invention has been described in detail, those familiar with the art to which this invention relates will recognize various alternative designs and embodiments for practicing the invention. All such alternative designs and embodiments and equivalents thereof are defined by the following claims.

What is claimed:

1. A method for estimating friction torque for an internal combustion engine in a powertrain of an automotive vehicle, the engine having an idle state, a fueled power-on state and a fuel cut-off state, the engine having a crankshaft, engine crankshaft speed being higher during operation in a fuel cut-off state than in an idle state, the powertrain including an engine control unit with memory registers in which a friction torque look-up table resides, the look-up table having input variables comprising engine speed and indicated engine torque, the method comprising the steps of:

- measuring engine crankshaft speed and indicated engine torque when the engine operation in the fuel cut-off state;
- measuring engine crankshaft speed fluctuations in the engine fuel cut-off state;
- reconstructing a first harmonic of a periodic signal to recover an amplitude that corresponds to engine friction losses using engine crankshaft speed measurements during operation of the engine in a fuel cut-off state; and
- updating the engine friction look-up table when new measurements of the engine friction torque obtained from an amplitude signal in the fuel cut-off state are available.

2. The method set forth in claim 1 wherein reconstruction of the first harmonic of a periodic signal is achieved using a filtering algorithm.

3. The method set forth in claim 2 wherein engine friction torque estimation is achieved using individual fluctuations of a high resolution engine crankshaft speed signal.

4. The method set forth in claim 3 wherein the engine crankshaft speed signal is achieved by measuring elapsed time between known engine crankshaft position signals.

5. The method set forth in claim 4 wherein engine speed fluctuations are recovered in the estimation of engine friction using a filtering algorithm that uses engine crankshaft speed variations during an engine fuel cut-off state.

6. The method set forth in claim 5 wherein the engine friction look-up table is adapted when new values of friction torque are available.

7. The method set forth in claim 6 wherein the filtering algorithms have trigonometric functions that are computed recursively whereby the algorithm is computationally efficient in an estimation of engine friction torque during engine fuel cut-off operation.

8. A method for estimating friction torque for an internal combustion engine in a powertrain of an automotive vehicle, the engine having an idle state, a fueled power-on state and a fuel cut-off state, the powertrain including an engine control unit with memory registers in which a friction torque look-up table resides, the look-up table having input variables comprising engine speed and indicated engine torque, the method comprising the steps of:

measuring engine crankshaft speed and determining indicated engine torque;

reconstructing a first harmonic of a periodic signal to recover an amplitude that corresponds to engine friction losses using current engine crankshaft speed measurements during operation of the engine in a fuel cut-off state;

comparing newly estimated engine friction torque with engine friction torque in memory registers at a certain crankshaft speed and indicated torque; and adapting the look-up table of the engine friction torque by changing the position and orientation of a mathematical three-dimensional frictional surface as a function of engine speed and indicated torque compensating changes in engine operating conditions.

9. The method set forth in claim 8 wherein adaptation of the look-up table comprises calculation of a compensation term in the form of a polynomial that approximates a difference between new values of engine friction torque based on new measured data and previous values of engine friction torque in the look-up table.

10. The method set forth in claim 8 wherein the adaptation of the look-up table comprises step-wise regression computations using new data sets of small size that are not insignificantly different from previously measured data sets whereby the method is computationally efficient and implementable.

11. A method for estimating friction torque for an internal combustion engine in a powertrain of an automotive vehicle, the engine having an idle state, a fueled power-on state and a fuel cut-off state, the powertrain including an engine control unit with memory registers in which a friction torque look-up table resides, a compensation term for the friction torque look-up table being presented in the form of a polynomial having coefficients that determine the position and the orientation of a mathematical three-dimensional friction surface and having input variables comprising engine speed and indicated engine torque, the method comprising the steps of:

measuring engine crankshaft speed and determining indicated torque during operation of the engine in the fuel cut-off state; and adapting the look-up table friction torque for variations in the input variables whereby friction torque can be predicted for a wide range of speed and indicated torque values.

12. The method set forth in claim 11 wherein adaptation of the look-up table comprises adapting the parameters in a step-wise least-squares technique wherein new parameters are chosen in each step as new data of engine friction torque as a function of engine speed and indicated torque are available.

13. The method set forth in claim 12 wherein the adaptation of the look-up table is executed regressively whereby each new term of the polynomial is examined at each step of the regression to determine significance of new sets of parameters.

14. The method set forth in claim 13 wherein the significance of new sets of parameters is determined by comparing variances in each step of the step-wise regressive technique compared to data in a previous step and rejecting the sets of parameters that do not result in a reduced error in friction torque estimation relative to a corresponding error in a previous step.

15. The method set forth in claim 14 wherein the step of adapting the look-up table, which is presented in the form of a surface that defines friction torque as a function of the input variables, comprises adding a compensation term to each node of the look-up table, whereby values of estimated friction torque at multiple locations in the manifold can be predicted using values of manifold parameters at fewer locations in the manifold.

16. The method set forth in claim 15 wherein the method includes the step of adding the compensation term in the form of a polynomial to the look-up table, the polynomial having coefficients that define its characteristics, the coefficients residing in the memory registers;

updating the coefficients using new measured engine data in successive steps and determining an approximation error in a current step and a previous step; and rejecting a compensation term from inclusion in the table in a current step if the magnitude of a variance of the approximation error is not significantly reduced with respect to the previous step.

* * * * *